US007203656B2

(12) United States Patent
Lotvin et al.

(10) Patent No.: US 7,203,656 B2
(45) Date of Patent: Apr. 10, 2007

(54) COMPUTER APPARATUS AND METHODS SUPPORTING DIFFERENT CATEGORIES OF USERS

(76) Inventors: Mikhail Lotvin, 325 E. 64th St., apt. 310, New York, NY (US) 10021; Richard Michael Nemes, 1432 E. 35th St., Brooklyn, NY (US) 11234-2604

( * ) Notice: Subject to any disclaimer, the term of this patent is extended or adjusted under 35 U.S.C. 154(b) by 493 days.

(21) Appl. No.: 10/184,440

(22) Filed: Jun. 28, 2002

(65) Prior Publication Data

US 2002/0165777 A1    Nov. 7, 2002

Related U.S. Application Data

(63) Continuation of application No. 09/699,959, filed on Oct. 30, 2000, now abandoned, which is a continuation of application No. 09/294,761, filed on Apr. 19, 1999, now Pat. No. 6,178,407, which is a continuation of application No. 08/826,550, filed on Apr. 4, 1997, now Pat. No. 5,907,831.

(51) Int. Cl.
*G06Q 30/00* (2006.01)
(52) U.S. Cl. .................................................. 705/13
(58) Field of Classification Search ................ 705/1, 705/7, 14; 434/350; 600/545; 463/40
See application file for complete search history.

(56) References Cited

U.S. PATENT DOCUMENTS

| | | | |
|---|---|---|---|
| 4,654,818 A | | 3/1987 | Wetterau, Jr. |
| 4,718,107 A | * | 1/1988 | Hayes ........................... 725/27 |
| 4,837,422 A | * | 6/1989 | Dethloff et al. .............. 235/380 |
| 4,877,408 A | | 10/1989 | Hartsfield |
| 5,002,491 A | | 3/1991 | Abrahamson et al. |
| 5,025,372 A | * | 6/1991 | Burton et al. ................. 705/14 |
| 5,034,807 A | | 7/1991 | Von Kohorn |
| 5,128,752 A | | 7/1992 | Von Kohorn |
| 5,211,563 A | | 5/1993 | Haga et al. |
| 5,257,185 A | | 10/1993 | Farley et al. |
| 5,286,036 A | * | 2/1994 | Barabash ..................... 273/429 |
| 5,485,518 A | * | 1/1996 | Hunter et al. ................. 725/28 |
| 5,537,314 A | * | 7/1996 | Kanter ......................... 705/14 |
| 5,561,709 A | | 10/1996 | Remillard |

(Continued)

FOREIGN PATENT DOCUMENTS

EP    0749081 A1 *  12/1995

(Continued)

OTHER PUBLICATIONS

Dedrick, Rick, Interactive Electronic Advertising IEEE 0-7803-2076-X, 1994, pp. 59-66.*

(Continued)

*Primary Examiner*—Tariq Hafiz
*Assistant Examiner*—Scott L. Jarrett

(57) ABSTRACT

A central computer system preferably communicates with local computers of users over the Internet and stores account information of users. Preferably, users may interact with information provided by the central computer system or third party computer systems. The availability of such information is preferably controlled by a different user. The central system preferably stores data representing rewards available to the users as a result of interaction with such information. The users preferably may obtain products or services, in accordance with the stored rewards, wherein at least some of such products or services are promoted by a different user, which provides financing for at least some of the items obtained with the reward. Preferably, the central system includes administrative software that may provide monitoring and managing performance of the system, fraud detection, and management of the information available to the users.

19 Claims, 15 Drawing Sheets

U.S. PATENT DOCUMENTS

| | | | |
|---|---|---|---|
| 5,678,041 A * | 10/1997 | Baker et al. | 707/9 |
| 5,697,844 A * | 12/1997 | Von Kohorn | 463/40 |
| 5,706,507 A * | 1/1998 | Schloss | 707/104.1 |
| 5,708,780 A * | 1/1998 | Levergood et al. | 709/229 |
| 5,715,314 A | 2/1998 | Payne et al. | |
| 5,722,418 A * | 3/1998 | Bro | 600/545 |
| 5,727,950 A * | 3/1998 | Cook et al. | 434/350 |
| 5,727,951 A | 3/1998 | Ho et al. | |
| 5,734,838 A * | 3/1998 | Robinson et al. | 705/14 |
| 5,740,549 A * | 4/1998 | Reilly et al. | 705/14 |
| 5,743,743 A | 4/1998 | Ho et al. | |
| 5,743,746 A | 4/1998 | Ho et al. | |
| 5,757,917 A | 5/1998 | Rose et al. | |
| 5,758,258 A * | 5/1998 | Shoff et al. | 725/116 |
| 5,761,662 A * | 6/1998 | Dasan | 707/10 |
| 5,774,869 A * | 6/1998 | Toader | 705/10 |
| 5,774,870 A * | 6/1998 | Storey | 705/14 |
| 5,779,549 A | 7/1998 | Walker et al. | |
| 5,794,210 A | 8/1998 | Goldhaber et al. | |
| 5,809,144 A | 9/1998 | Sirbu et al. | |
| 5,832,212 A * | 11/1998 | Cragun et al. | 726/2 |
| 5,845,260 A * | 12/1998 | Nakano et al. | 705/26 |
| 5,855,008 A * | 12/1998 | Goldhaber et al. | 705/14 |
| 5,864,822 A * | 1/1999 | Baker, III | 705/14 |
| 5,889,958 A * | 3/1999 | Willens | 709/229 |
| 5,907,831 A * | 5/1999 | Lotvin et al. | 705/14 |
| 5,913,040 A * | 6/1999 | Rakavy et al. | 709/232 |
| 5,937,391 A * | 8/1999 | Ikeda et al. | 705/14 |
| 5,953,710 A * | 9/1999 | Fleming | 705/38 |
| 5,974,398 A * | 10/1999 | Hanson et al. | 705/14 |
| 5,987,606 A * | 11/1999 | Cirasole et al. | 726/11 |
| 5,987,611 A * | 11/1999 | Freund | 726/4 |
| 5,991,807 A * | 11/1999 | Schmidt et al. | 709/225 |
| 5,996,011 A * | 11/1999 | Humes | 709/225 |
| 5,999,596 A * | 12/1999 | Walker et al. | 379/91.01 |
| 6,009,412 A * | 12/1999 | Storey | 705/14 |
| 6,024,572 A * | 2/2000 | Weyer | 434/169 |
| 6,139,330 A * | 10/2000 | Ho et al. | 434/322 |
| 6,144,944 A * | 11/2000 | Kurtzman et al. | 705/14 |
| 6,178,407 B1 * | 1/2001 | Lotvin et al. | 705/14 |
| 6,178,408 B1 * | 1/2001 | Copple et al. | 705/14 |
| 6,434,607 B1 * | 8/2002 | Haverstock et al. | 709/217 |
| 6,529,878 B2 * | 3/2003 | De Rafael et al. | 705/14 |
| 6,597,770 B2 * | 7/2003 | Walker et al. | 379/93.12 |
| 6,745,367 B1 * | 6/2004 | Bates et al. | 715/500 |
| 2001/0031456 A1 * | 10/2001 | Cynaumon et al. | 434/350 |

FOREIGN PATENT DOCUMENTS

| | | | |
|---|---|---|---|
| EP | 0822535 A2 * | | 1/1996 |
| WO | WO 97/07656 | * | 3/1997 |
| WO | WO 98/41913 | * | 3/1997 |

OTHER PUBLICATIONS

Livingston's Server-based ChoiceNet Technology Offers Customizable Control Over Internet Access Business Wire, Apr. 1, 1996.*

Avalos, George, Pleasonton Firm Devises Sumt Fileter for Internet Contra Costa Times, Apr. 12, 1996.*

Livingston, Yahoo! Partner to Make Internet Kid-Safel Yahooligans! is First Application of ChoiceNet Technology New Release, May 6, 1996.*

Resnick, Paul, PICS: Internet Access Controls without Censorship Communications of the ACM, vol. 39, No. 10, 1996, pp. 87-93.*

Borg, Kim, Internet is for business—not monkey business Computer Technology REview, vol. 16, No. 9, Sep. 1996.*

Novelli, Joan, Cybersitter—Safe Surfing for the Classroom Electronic Learning, vol. 6, No. 3, Nov./Dec. 1996, p. 45.*

InterGo.com Web Pages InterGo Communications Inc., Jan. 1997, Retrieved from Archive.org Mar. 15, 2006.*

Bascom.com Web Pages Bascom Global Internet Services Inc., Apr. 1997, Retrieved from Archive.org Mar. 15, 2006.*

Livingston.com Web Pages—ChoiceNet Livingston Enterprises Inc., Apr. 1997, Retrieved from Archive.org Mar. 15, 2006.*

Miller, Leslie, Blocking controls let technology do the policing job USA Today, Aug. 27, 1996.*

Resnick, Paul et al., PICS: Internet Access Controls Without Censorship Association of Computing Machinery, Oct. 1996, vol. 39, No. 10, pp. 87-93.*

Cuthbert, Wendy, Headliner takes on PointCast: New personalized info service skips the advertising Strategy Magazine, Jan. 6, 1997.*

Davey, Tom, Ad-free news to desktops InformationWeek, Jan. 20, 1997, vol. 614, pp. 68-69.*

Levitt, Jason, Rating the Push Products InformationWeek, Apr. 28, 1997, vol. 628, pp. 53-59.*

* cited by examiner

COMPUTER APPARATUS AND METHODS SUPPORTING DIFFERENT CATEGORIES OF USERS

CROSS-REFERENCE TO RELATED APPLICATIONS

This application is a continuation application of application Ser. No. 09/699,959 abandoned, filed Oct. 30, 2000 (incorporated by reference herein in its entirety), which is a continuation application of application Ser. No. 09/294,761 filed Apr. 19, 1999, now U.S. Pat. No. 6,178,407, issue date Jan. 23, 2001, which is a continuation application of application Ser. No. 08/826,550 filed Apr. 4, 1997, now U.S. Pat. No. 5,907,831, issue date May 25, 1999, which is incorporated by reference herein in its entirety.

BACKGROUND OF THE INVENTION

Today, computer technology has advanced to a great extent and continues to develop in giant steps. Powerful computer systems are available to consumers at reasonable prices. Computer networks, examples of which are the Internet and America Online™, are accessible at reasonable cost to all. Digital graphics, images, audio, video, and multimedia are widely available on discs and over networks. Software tools and languages, C++ and Java, for example, are now powerful enough to enable software developers to build sophisticated applications, including those running on networks.

The processing, storage, multimedia, and networking capabilities of modern computers, such as personal computers, are perfectly suited for presenting educational and cultural content in an interactive, creative, and interesting fashion. However, educational and cultural applications of computers have not reached their full capacity and there is a need to develop computer technology that facilitates more extensive use of computers for educational and cultural purposes.

SUMMARY OF THE INVENTION

This invention relates to computer technology, including computer networks, and the preferred embodiment is directed to the implementation of computer technology for educational and cultural enrichment.

The computer system and method of the preferred embodiment uses computer technology in a unique way to motivate children to devote more time to educational and cultural enrichment. It should be noted that although the preferred embodiment relates to a system aimed at the education of children, as understood by persons skilled in the art, other applications of the disclosed system are also envisioned here.

In general, in the preferred embodiment, educational material is provided at a child's local computer (also referred to as a "user's computer") under control of a central computer system. Children's local computer and a central computer are connected over a computer network. On completing a particular educational task, a child is rewarded with a certain number of points. Children's accumulated points are stored centrally. Points are based on criteria consistent with the educational material and, for example, are awarded based on the level of difficulty of a given task, the child's level of performance, and other considerations, such as progress demonstrated in a certain discipline over time.

Points that a child accumulates by completing educational exercises can be redeemed towards the purchase of goods and services offered through the system of the preferred embodiment by its commercial participants. Purchasing transactions are also administered by the central computer and can proceed in a variety of ways. For example, the child may order goods and services by selecting from menus presented by the central computer, which, in turn, orders the selected items by telephone, e-mail, mail, or otherwise from a vendor or distributor for delivery. The central computer may also send a message to the local computer to print out certificates redeemable at participating vendors of goods and services. Also, points may be redeemed by downloading requested goods available in digital electronic form, such as software, games, music, and video. It is preferred that the offered goods and services be items desirable by the children so that the prospect of obtaining these items is a motivation for the children to diligently pursue the educational materials available in the system.

Parents have their own way of accessing the system of the preferred embodiment, and it is preferred that the parents' password not be given to a child, who has his own, usually different password. Parents preferably use the system for several purposes. First, parents support their children's purchasing activity financially. Preferably, the parent authorizes the system to periodically (e.g. monthly) allow purchases to be made through the redemption of the child's points, up to a certain limit, using the parents' credit card account, or makes other payment arrangements (e.g., though the use of electronic cash or direct account withdrawal). Preferably, part of the parents' payment is used as a periodic service fee for the service provided by the preferred embodiment of this invention, while the rest is used for financing the redemption of points by the child for goods and services. Moreover, the parent can authorize a system-initiated increase in the purchasing power of the child—a "bonus"—by, for example, permitting certain advertising messages to be displayed to the child as the child uses the system.

In the preferred embodiment, the parent controls the content of the material available for presentation to the child. For example, the parent may limit the difficulty of educational presentations to be made to the child by specifying the age of the child, or by indicating an explicit desired level of difficulty. Also, other considerations, such as whether to emphasize mathematics, science, literature, music, art, etc., can be under the control of the patent. Furthermore, the parent may exclude certain categories of goods from being made available to the child for exchange of earned points by the child.

In this consumer-oriented society there are desirable commercial items—deemed "cool"—that children of various ages want, such as popular games, toys, movies, clothing, admission tickets to arcade games and sporting events, etc. Parents typically spend money to purchase these items for their children. These items, though usually innocent, frequently do not bring intellectual, cultural, or developmental benefits to the children. Often, such items are advertised and promoted through mass media that are not designed to educate, enlighten or develop, such as television, which at best serve as passive entertainment. Parents, on the other hand, usually prefer spending money on educational, cultural, and developmental products that facilitate the intellectual and emotional growth of their children.

The present invention uniquely fulfills the desires of parents to facilitate their children's intellectual development, and, at the same time, provides children with access to the goods and services they most desire. Although this goal is accomplished by the system of the preferred embodiment, other useful applications with perhaps different goals than the ones of the disclosed system can be built by persons skilled in the art on the basis of this disclosure.

It is understood that "parent" is not necessarily a biological parent, custodian, or adult authority, and can be anyone who performs the tasks identified herein with "parent." Similarly, the "child" is not required to have a biological, subservient, or dependent relationship to the parent and can be anyone who performs the tasks identified herein with "child." The "central computer system" (also referred to as the "central computer," or "central facility") may include one or more physical computers as determined by specific implementation trade-offs, given the constraints of a particular implementation, as known in the art. In some embodiments, the central computer may comprise computers loosely interconnected by a computer network.

Educational materials, presentations, and exercises refer to content used in the preferred embodiment. Preferably, this content includes a variety of educational and cultural presentations and exercises, which include standard textbook-like exercises, spelling, mathematics, history, and geography lessons, reading comprehension, reading an article on a subject and answering questions, standardized tests, scientific material and problems, and all other content used for educational purposes. Other forms of educational and cultural materials can be provided as well, such as learning about music, art, and theater—through multimedia presentations, for example—and playing chess. Competitions, in which winning participants earn points, are also included in the definition. In fact, educational materials include any and all educational and cultural exercises and material intended to educate, enlighten, train, or develop. A person skilled in the art will appreciate that in embodiments for purposes unrelated to education, other relevant content can substitute for the educational content of the preferred embodiment.

In other embodiments, terms such as "parent," "child," and "educational materials and presentations" can have different meaning, and can be entirely unrelated to the education of children. For example, a company's management can sponsor employee training based on the system of this invention. In such an embodiment, the company plays the role of "parent," paying for on-line courses, and employees play the role of "children," who earn college credit for their participation. The company finances educational courses and optionally exercises some control over the selected curriculum; employees take courses, which constitutes their participation. "Educational materials" include course lectures and materials, assignments, and examinations, while earned "points" are credits redeemable for college degrees at participating educational institutions.

Educational materials can be provided to the child in a variety of ways. They can be available on the central computer of the service of this invention, for example, or provided by third party content providers. To use them, the child may interact directly with the remote computer of the service, or alternatively, they may be downloaded to the child's local computer, so that only the resultant tally of earned points is subsequently provided to the central computer for storage. Another way that the materials can be provided is on a disk, such as a CD-ROM, so that only the results of the interaction with the child are provided to the central computer.

A user's computer is any appropriate data processing device available to participants in the service provided by the system of this invention. In the preferred embodiment, it is a conventional personal computer with a modem (or other network connection), a CD-ROM drive, hard-disk drive, one or more diskette drives, a central processing unit, random access memory, color monitor, keyboard, a graphical interactive input device, such as a mouse, and printing devices, such as laser and ink-jet printers. "User computers" (or "local computers") also can be other computer devices that may be used by users of this invention, such as, computer terminals with sufficient intelligence and interfaces, computer workstations, Internet appliances and TV's, and other computer devices having sufficient processing, storage, input, and display capabilities.

BRIEF DESCRIPTION OF THE DRAWINGS

The invention will be better understood when taken in conjunction with the following detailed description and accompanying drawings, in which.

DETAILED DESCRIPTION OF THE PREFERRED EMBODIMENT

Figure 1:
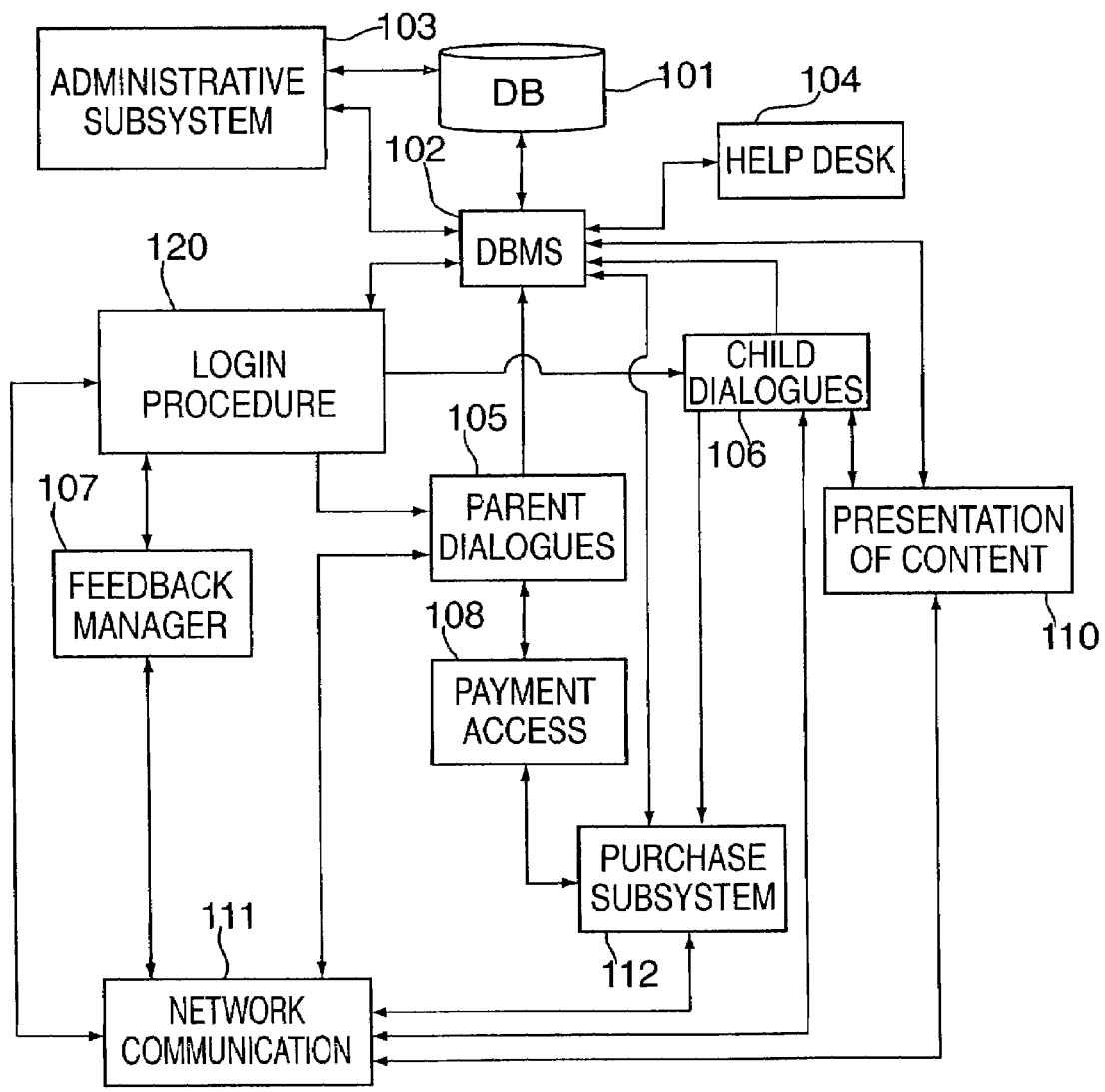
FIG. 1 illustrates computer architecture and organization of the preferred embodiment.

FIG. 1 illustrates the overall architecture of the central computer system in the preferred embodiment. Block 101 illustrates the database storage subsystem. In the preferred embodiment, it is one or more magnetic storage disks organized to support the information storage and retrieval needs of the system disclosed below. Such disks are known in the art and are available commercially. Also, other physical storage media, e.g., optical storage, may be used, as known in the art. In the preferred embodiment, the entire database storage system is located at the central computing facility. A person skilled in the art will appreciate that in other embodiments it can be distributed throughout different sites, including storage at users' local computers. In the preferred embodiment, each of the remaining blocks shown in FIG. 1 are software modules that execute on a computer or computers located at the central facility. (In other embodiments, some or all of these modules can execute in a distributed computing environment, including users' local computers.)

Block 102 depicts the database management system (DBMS) that provides capabilities typical for such a system, including data retrieval, insertion, and modification, as well as database queries, as is known in the art. It is used in conjunction with the file system capabilities provided by the native Operating System. In the preferred embodiment, some data, as described below, is not managed by the database management system but is instead handled through the Operating System's file system directly. In the preferred embodiment, the database management system 102 is a relational database management system organized to support the data needs of the system disclosed herein. (In other embodiments, other data models, e.g., "hierarchical" and "network," may be used. Direct use of the computer's file system capabilities, which are provided by the computer's native Operating System, is possible in some embodiments as well, which could obviate the need for a database management system altogether.) Preferably, database management system 102 is based on commercially available database management software. Such software is presently available, for example, as IBM®'s DB2™, ORACLE®'s line of database management systems, or the INFORMIX® brand of database systems. Specific implementation trade-offs should be considered in selecting the database management system.

Administrative subsystem 103 manages the resources of the system and, as illustrated, is interfaced to the database management system 102. The administrative subsystem 103 is used by the system administrator(s) and management for monitoring performance; fraud detection; performance tuning adjustments; adding, deleting, and modifying educational and cultural material and presentations; modifying user data in the database; billing; and system backup and recovery.

The help desk subsystem 104 supports human operators who communicate with users. The operators deal with problems and concerns of users by answering questions, providing suggestions, and addressing users' concerns in any other way. The help desk subsystem is also interfaced to the data base management system 102 to obtain up-to-date information about the users and the system. The help desk subsystem software includes capabilities for querying and modifying the system database (block 101) through the database management system. In the preferred embodiment, operators interact with users by voice over telephone and/or interactively through computer-to-computer communication. The operators are provided with networked personal computers interfaced to the database and with telephones. They receive telephone calls and e-mail distributed in accordance with operator queues as known in the art. (In other embodiments, other methods of communication may be used, such as mail and facsimile.)

The log-in subsystem 120 includes software supporting the log-in procedure that is used to verify passwords of users who request access to the system, as well as software for opening new user accounts, as discussed in more detail subsequently. On a successful log-in, three subsystems of the system are available to support interaction with the user after the log-in subsystem 120 hands-off control to one of the three. These three subsystems are: parent dialogues, block 105, for facilitating interaction with the parent, as described in more detail below; child dialogues, block 106, for facilitating interaction with the child, as described in detail below; and feedback manager, block 107, for facilitating interaction between users and the system's management, as discussed in more detail below. The feedback manager 107 is available to both the parent and the child, whereas, preferably, the parent and child dialogues subsystems are accessible, respectively, by parents only and by children only.

The payment access subsystem, block 108, is implemented using secure software, as known in the art, for handling payment transactions. In the preferred embodiment, payments are handled through credit cards, so that the payment subsystem supports interactions with the credit card company of the parent. In other embodiments, however, it may support other forms of payment, such as e-cash (electronic cash), account withdrawal, ordinary payment by cash, check, or money order, and invoice billing.

The presentation of content subsystem, block 110, delivers, in the preferred embodiment, educational materials during the child dialogues. This subsystem provides educational materials to the child in response to inputs received from the child during the child's interaction with the system. In addition, the presentation of content subsystem 110 performs functions connected with the awarding of points on completing an educational assignment.

In the preferred embodiment, the educational materials delivered to the child by the presentation of content subsystem 110 can be located centrally, i.e., at the database (block 101) of the system, in which case the educational presentations subsystem retrieves and activates these materials. Preferably, the central computer retrieves software from the database (block 101) and downloads it to the user's computer, which executes it and then returns the results to the central computer. Alternatively, the educational material software can be executed by the central computer, or the execution can be interleaved between the central and local computers. In addition to being centrally located, however, educational materials can be wholly or partially resident on an appropriate storage medium, such as magnetic or optical storage, located locally at the user's computer.

In the case that the presentation of the educational materials is executed locally, the child chooses a particular presentation, which the presentation of content subsystem uses to search the database (block 101 of FIG. 1). On locating the record of information associated with the chosen presentation for the particular child and finding an indication that the chosen presentation resides locally at the user's computer, control is handed to a portion of educational presentation subsystem 110 software that executes locally on the user's computer. If the associated database record indicates that software that executes on local computers is stored at the central facility, the central facility retrieves this software from the database, downloads it to the local computer, and then transfers control to the locally downloaded software.

The locally running software manages the presentation of the educational material and may administer any examinations that may be associated with the presentation in order for the child to earn points. On completion, the locally executing software establishes computer communication with the central computer to transmit the results of the presentation and interaction, typically the number of points earned, if any, by the child, for correlation and aggregation with the child's accumulated point total. If the locally-running software had been downloaded from the central computer, it is preferably deleted following termination of its execution.

Other content—"educational materials" in the preferred embodiment—can be provided by third-party content providers, in which case the database 101 may contain only an indication that these presentations are available, along with the network location of such material. The third party content can either be downloaded and executed locally at user's computer or executed at the third-party computer.

The purchase subsystem 112 manages the purchase of goods and services based on the points accumulated by the child. It is responsible for presenting appropriate menus of offered goods and services that may be optionally based on the parents' preferences; taking the child's purchase requests; ordering chosen products and services from appropriate vendors, distributors, and service providers; printing a coupon that can be exchanged for the chosen goods or services if appropriate; and downloading a digital product, or accomplishing the transaction otherwise. In addition, the purchase subsystem 112 adjusts the number of points available for further purchases following a purchase. To bill the parents' credit card account for purchases made by the child, this subsystem is interfaced to the payment access subsystem 108. In the preferred embodiment, the purchase subsystem 112 is a software module executing wholly on a computer or computers at the central facility. (In other embodiments, some or all of this software can execute at various sites, which may include users' local computers.)

The network subsystem 111 handles computer communication with users and third party content providers by providing access to appropriate computer networks. Also, participating commercial entities may be connected to these networks for electronic ordering of goods and services. These communications can take place either on the publicly available Internet, using protocols such as TCP/IP, or on private networks. In the preferred embodiment, this subsystem interacts with complementary communication software executing on users' local computers, third party content providers' computers, participating commercial entities' computers, and computer network servers. (In other embodiments, different arrangements may be found as known in the art.)

Figure 2:
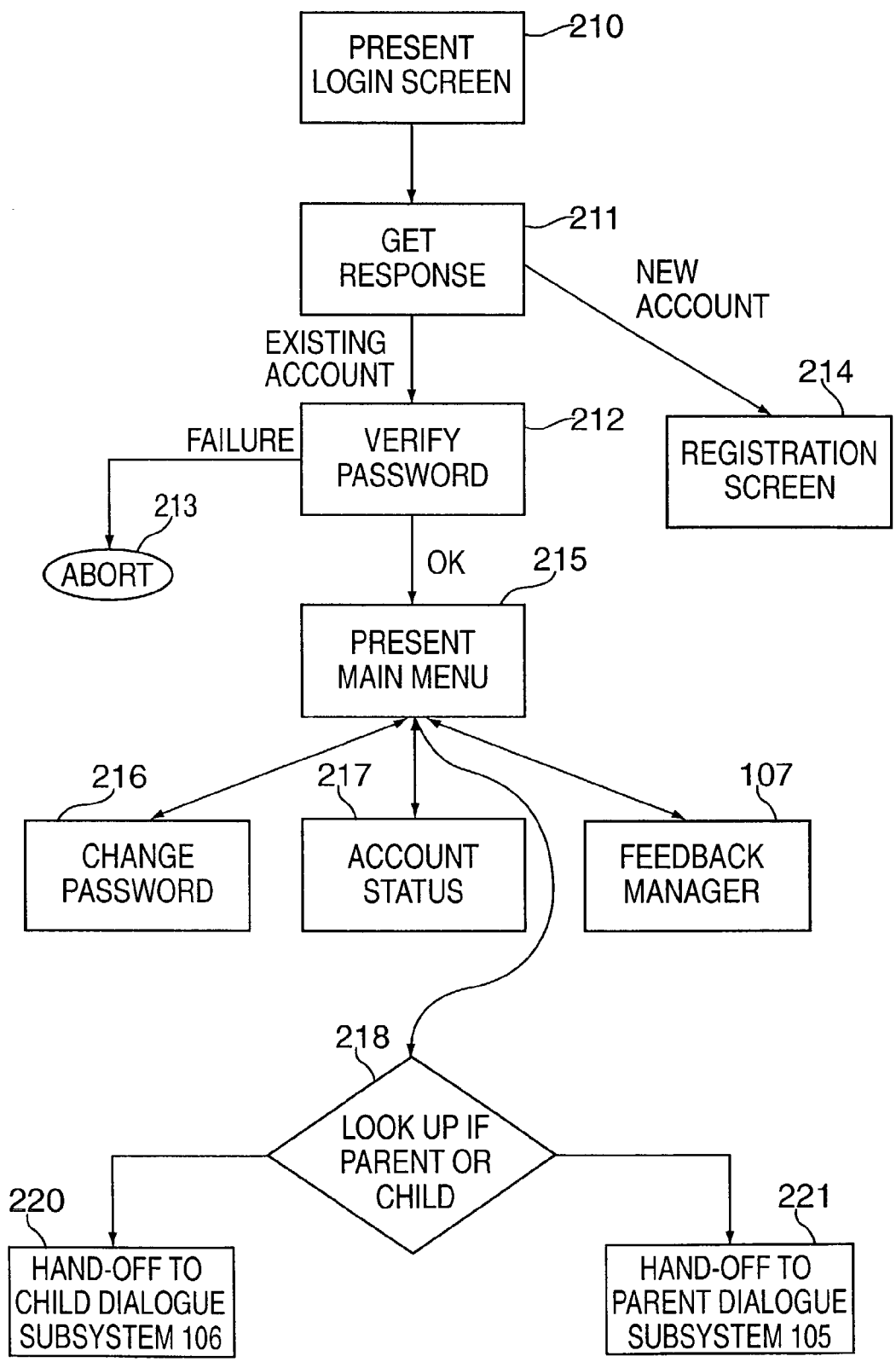
FIG. 2 illustrates the flowchart of log-in procedure.

FIG. 2 depicts the log-in procedure of the preferred embodiment, which is illustrated as block 120 of FIG. 1. At block 210, the user gains access through the communications network to the central computer and is then presented with the log-in screen, in which the system requests the user to enter a unique identifier, known in the art as a "password," or indicate that a new user registration is desired. The user provides the response at the following block 211 at his computer. In the preferred embodiment, in which the services provided by the invention are controlled by the central computing facility, the response is then transmitted to that central computing facility. The user may enter his password if he is already registered as a user of the system with an existing account, or he may indicate that he wishes to establish an account on the system and register as a new user.

When a new user wants to establish an account, he is presented with a registration screen, shown as block 214, that allows him to enter necessary information, which is then stored centrally at the database (block 101 of FIG. 1). Initial registration is typically done by the parent, who provides credit card or other payment information, which is verified before registering passwords for the users (i.e., parents and children) associated with the particular account on the system. (The credit card account can be verified electronically, or alternatively, using the assistance of an operator.) Typically, at least two passwords are established for a given account: one for the parent and one for each child associated with the parent. In the preferred embodiment, the parent cannot use the child's password to, for example, force the child to redeem points on specific goods and services desired by the parent. Similarly, a child should not know his parent's password, to prevent the child from changing the payment limit and other preferences established by the parent. Preferably, during registration at block 214, the parent also provides initial preferences regarding the educational material and purchase guidelines for his child, which is detailed below. The preferences can be subsequently changed should the parent so desire. Preferably, these preferences include the amount of money that can be charged/withdrawn for the child's purchase of goods and services each period (e.g., monthly) and the difficulty and sophistication of educational material to be presented to the child. The preferences may also include the type of goods and services that the child may purchase when redeeming points; the type of material to be presented to the child, for example, verbal, mathematical, literary, artistic, scientific, and musical; and the allowing or disallowing of certain advertisements to be presented to the child during the course of the child's interaction with the system. Other preferences can be included in other embodiments.

When the user enters the password, it is provided to the password subsystem, shown as block 212, where it is verified using known means with reference to the collection of known passwords. In the preferred embodiment, the collection of known passwords is stored centrally in the database, block 101 of FIG. 1. If the password is invalid, the system provides a message to this effect and terminates the user session at block 213. Otherwise, the password is valid and the system provides the general presentation screen, shown as block 215, which in the preferred embodiment is a menu of options from which the user may choose. In the preferred embodiment, this menu includes options to change the password (block 216), view the current status of the account (block 217), send feedback messages (suggestions, complaints, and comments) to the system management (block 107), or proceed directly to the parent or child dialogue. (In other embodiments, other options may be included in addition to, or in place of, the ones shown here.) As indicated by the arrows pointing back to block 215, blocks 216, 217, and 107 return control to the general presentation screen on completion of their tasks. Finally, the log-in procedure hands off control to either the child dialogue subsystem (block 220) or the parent dialogue subsystem (block 221), depending on whether the test in decision box 218 indicates that the user who has just logged in is a child or a parent, respectively. In the preferred embodiment, this hand-off does not result in return of control directly to the log-in procedure, as was the case with blocks 216, 217, and 107 described earlier.

Figure 3:
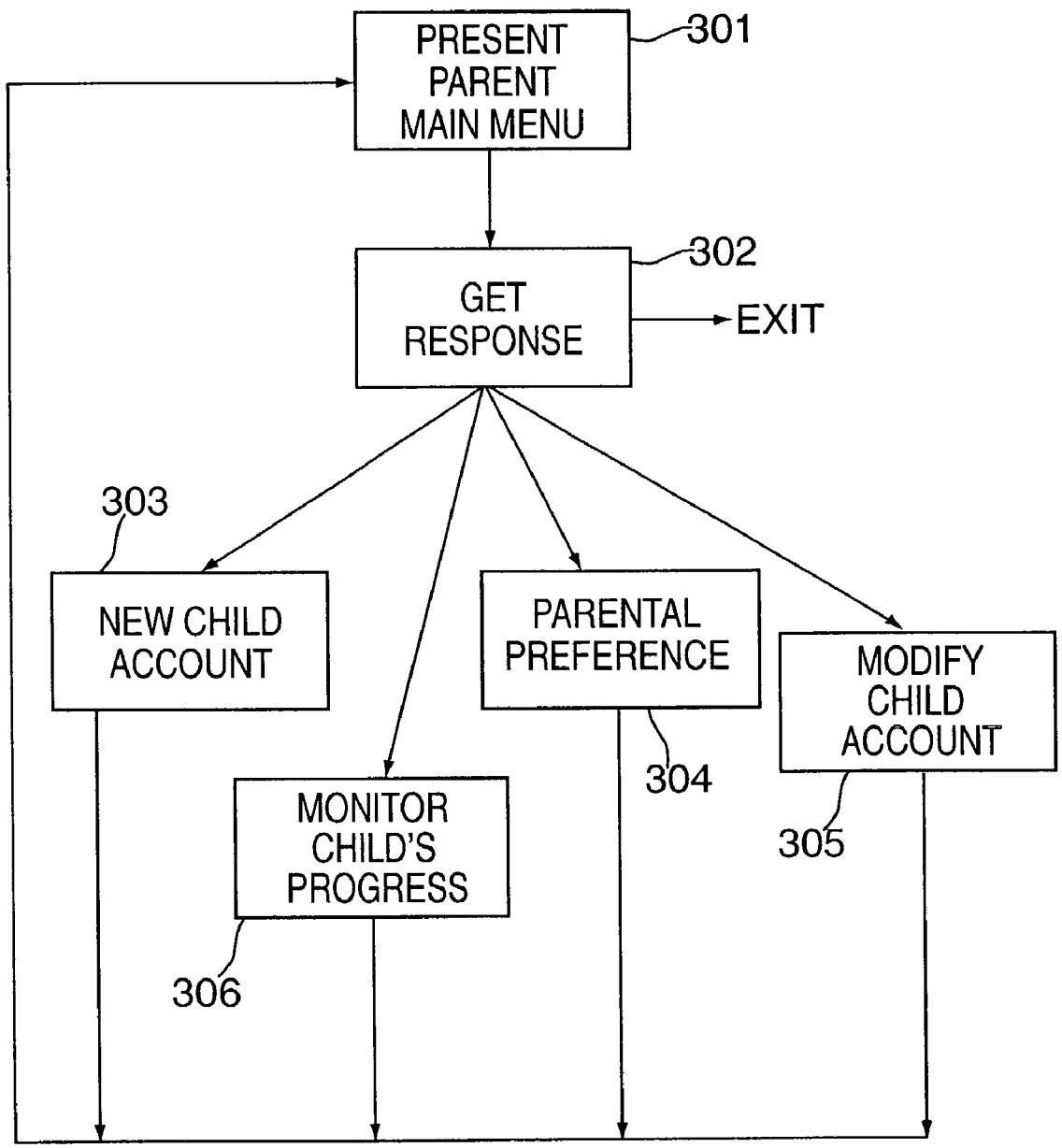
FIG. 3 illustrates the flowchart of parent dialogues.

FIG. 3 depicts the parent dialogues subsystem in the preferred embodiment. As shown in FIG. 3, the parent is presented with a high-level presentation menu at block 301. In the preferred embodiment, the central computer receives and interprets the parent's response at block 302. Illustratively, the system initiates the following capabilities based on the response from the parent: the parent can open a new child account at block 303, elect to modify an existing one at block 305, modify parental preferences at block 304, or monitor a child's or children's progress at block 306.

The functions performed at block 303 include giving the parent the opportunity to specify, for example, financial (e.g., credit card) information, preferences regarding educational presentations, and allowable purchases when the parent's child or children redeem points. The functions performed at block 305 include giving the parent the opportunity to modify information unrelated to educational presentation preferences that was previously presented to the system by the parent at block 303 or block 305.

At block 306, the parent can receive information regarding his child's or children's progress. Illustratively, at block 306 the system provides data to the parent about his child's or children's latest activities on the system, as well as other data, such as statistics about his child's or children's progress over time and his child's or children's strengths and weaknesses. In addition, the parent can view feedback messages sent by his child or children, and can communicate with his children, and, in other embodiments, with other users as well, using e-mail facilities as known in the art. Other useful data can include, for example, aggregate statistics (e.g., performance averages) of other children at comparable educational or age levels, and comparisons of the parent's child or children with other children. Other data presented to the parent at block 306 can include his child's or children's accumulated point totals, purchase history, and educational presentation history. At block 306, the parent may also view creative works of art, such as, for example, electronic drawings, music, stories, poems, and other multimedia creations, produced by his children. (In other embodiments, the parent can view creative works produced by users other than his children, and may even have the capability of contributing creative works to the system for presentation to other users or for inclusion in the library of educational presentations maintained by the system.) The information presented to the parent at block 306 is stored in the system database (block 101 of FIG. 1), or can be computed from data stored there.

At block 304, the parent is provided with a screen for modifying parental preferences regarding educational presentations to be made to his child or children. This includes specifying the child's level of difficulty and preferred educational materials. This may also include the parent allowing or disallowing the presentation of advertisements to the child and, if allowing advertisements, specifying categories of ads that may or may not be presented (e.g., allowing ads for toys that are only of a nonviolent nature, or prohibiting ads for candies and sweets).

When the parent completes interaction with the system at blocks 303, 304, 305, or 306, control returns to the presentation menu at block 301, where the parent may select another function or elect to exit.

Figure 4:
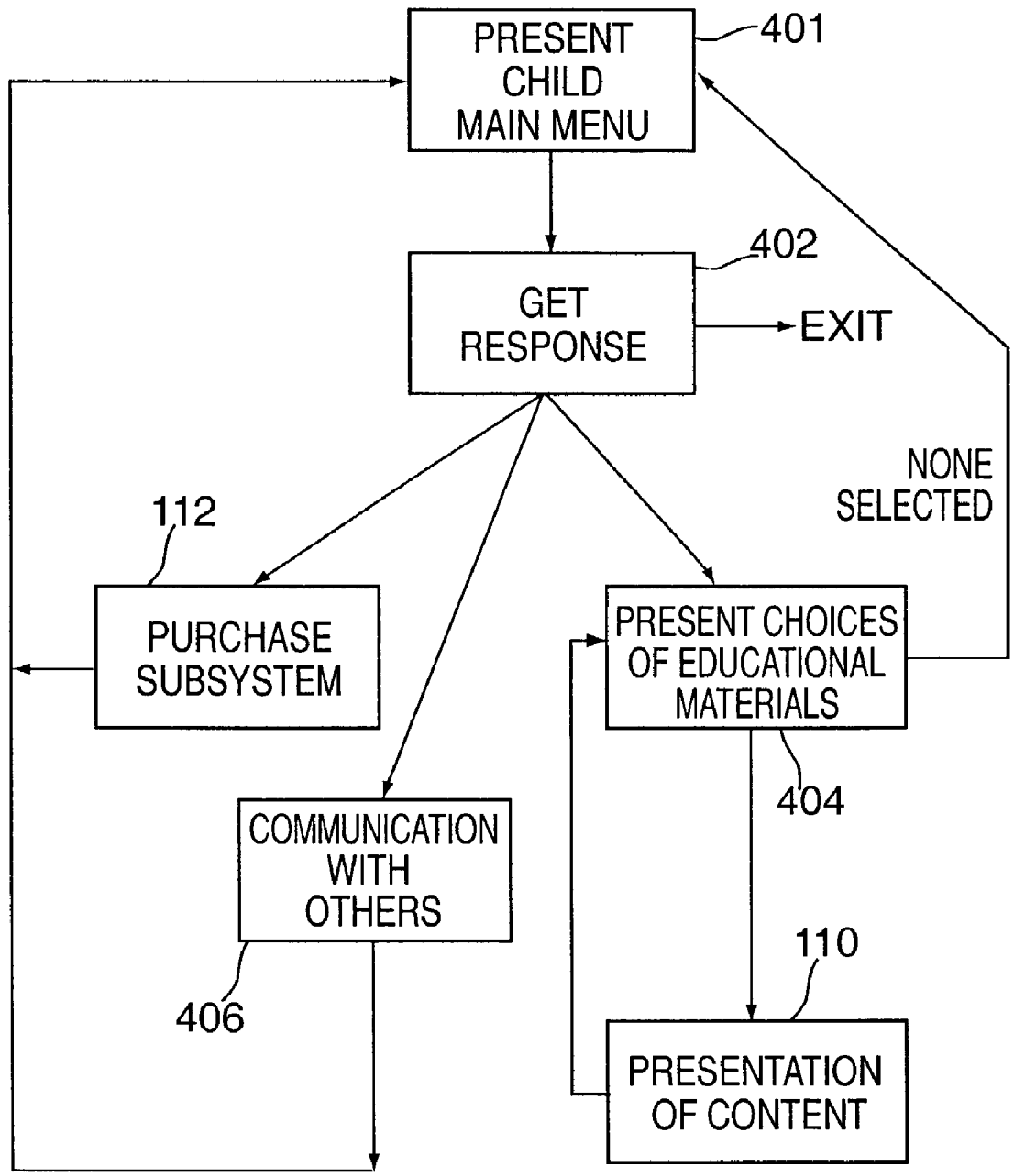
FIG. 4 illustrates the flowchart of child dialogues.

FIG. 4 depicts the child dialogues subsystem in the preferred embodiment. As shown in FIG. 4, the child is presented with a high-level menu at block 401. The central computer of the preferred embodiment receives and interprets the child's response at block 402. Illustratively, the system can initiate the following capabilities based on the response from the child: the child can request presentation of educational material at block 404, elect to make a purchase through a redemption of points at block 112, or communicate with other participants of the system at 406.

If the child's response at block 402 was a request for educational material, control proceeds to block 404, where the child is given a selection of activities, which are referred to here as "educational presentations." For example, these activities may include presentations that are followed by—or interleaved with—questions, lessons, homework, exercises, problems, reviews, assignments, projects, examinations, quizzes, puzzles, standardized tests, competitions, tournaments, and contests. The presentation material can be in the area of literature, mathematics, science, art, language, music, technology, games, such as chess, or any other field as desired in a particular embodiment. As indicated, in other contexts other suitable material would be used. In the example described above concerning corporate employees, "educational presentations" would be professional courses and associated examinations, technical or vocational training, and the like. Selection of content, which is educational in the preferred embodiment, depends on the specific embodiment of the system, and need not necessarily relate to education per se.

Based on the child's selection at block 404, a specific presentation identified to the system at 404 is provided at block 110, as described in further detail below. This presentation can be provided by downloading software to the user's computer from the central computer, interacting locally, and then sending the results of the interaction in a summary form to the central computer; directly interacting with the central computer; accessing a third party provider's computer and then sending the results of the interaction in an summary form to the central computer; downloading software from a third party provider and then sending the summary results to the central computer; or using content that is already stored at the user's computer and then sending the results to the central computer. Other modes of remote interaction with users that are known in the art are also possible, and include combinations of the methods mentioned above. Upon completion of the given presentation at block 110, control returns to block 404 where another presentation can be selected if so desired. If none are selected control returns to block 401.

Considering another choice at block 402, the child can choose to make a purchase by redeeming points through the purchase subsystem at block 112. The purchase subsystem at 112 provides necessary information to the child, such as the number of points accumulated by him and how many points may be redeemed, in addition to giving him the capability to transact a purchase. Available products together with their prices in points are organized as lists of items, or can be provided as a virtual shopping mall as known in the art. The interaction with the child at the time of product selection and purchase is described in more detail below. The products or services can be delivered to the child in various ways: by sending e-mail to product and service providers, by printing coupons at the child's computer, by downloading to the user's computer a software, music, or art product, and the like. To determine product information, e-mail or Internet connection to vendors may be available from the purchase subsystem in some embodiments.

The child may choose to communicate with other users of the system as illustrated at 406. Services such as discussion groups, electronic bulletin boards, and intra-system e-mail may be provided here as known in the art.

When the child completes interaction with a selected part of the child dialogue subsystem, control returns to the presentation menu at block 401, where the child may select another function or elect to exit.

Preferably, all displays provided to users have space available for advertisements, in order to increase the system's revenue. Alternatively, only certain displays selected by the operator of the system of a particular embodiment may contain advertisements. Methods and systems for including advertisements in on-line or downloaded material are known in the art, and can be implemented using appropriate programming languages and tools, such as Java. In some embodiments, a parent may control advertisers' access to displays shown to his child. Selection of advertisement based on parental preferences can be done by grouping advertisements into appropriate categories, for example, food, entertainment, toys, and the like, and precluding advertisement in those categories prohibited by the parent.

Figure 5A:
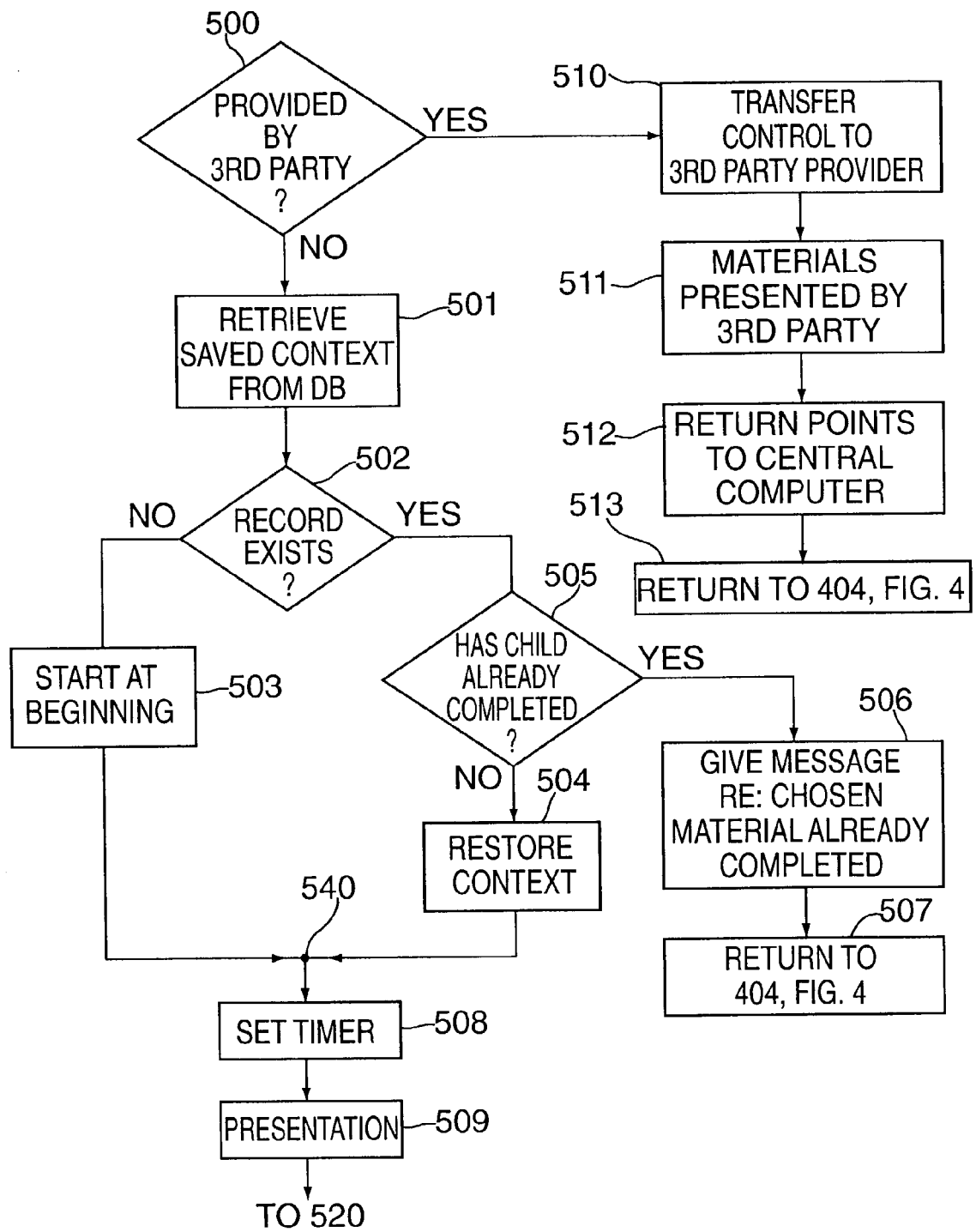
FIGS. 5A and 5B illustrate the flowchart of a general scenario of an educational presentation.
Figure 5B:
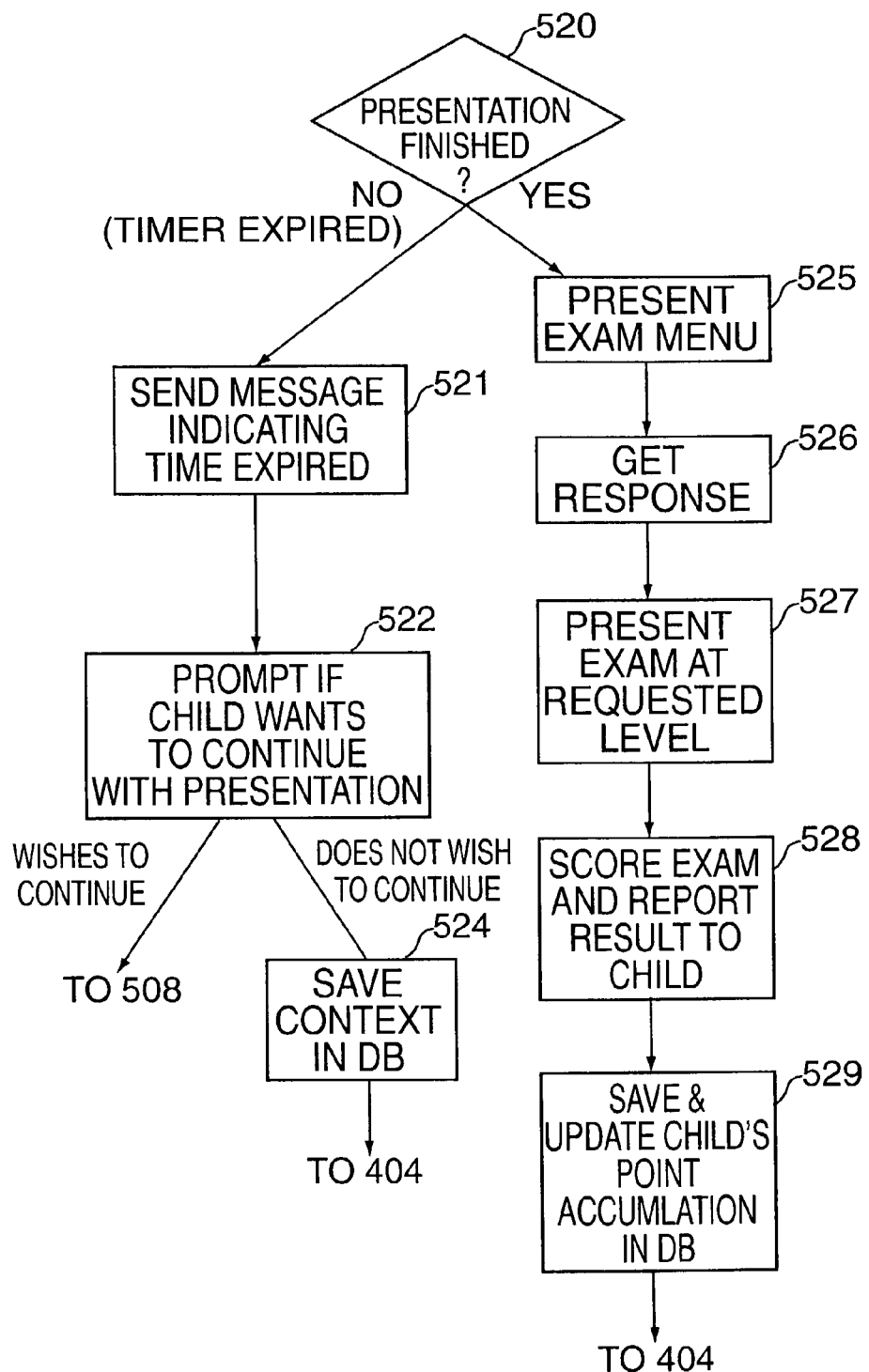

FIGS. 5A and 5B illustrate a typical scenario of an educational presentation in the preferred embodiment. At block 500, the system determines, based on information stored in the database (block 101 of FIG. 1), where the requested presentation material is stored. It might be stored in the system database, on the user's local computer, or at a third party provider's site. (In some embodiments, it may be stored at several places simultaneously or its constituent parts may be distributed across various sites.) If a third party provider is not involved, the presentation proceeds under the control of the central computer. In this case, control proceeds to block 501, where the system retrieves the child's previously saved context for the requested presentation from the database. The context is typically saved when, for any reason, the presentation is interrupted and the child exits before the presentation completes. The context records the state of the presentation at the moment of interruption. When a child completes a presentation, the fact that it completed is saved as the context, so as not to repeat the same presentation.

At block 502, if the saved context is not found for the given child and the requested presentation, i.e., this is the first time that the child has requested this presentation, control proceeds to block 503 where the presentation is started from its beginning. If the saved context is found at block 502, the system checks at block 505 whether the child has already completed the presentation. If so, since it is not productive for the child to view the same presentation again, the system issues an appropriate message at block 506, and at block 507 control returns to block 404 of FIG. 4.

Otherwise, the system restores the presentation substantially to the point of interruption at block 504 based on the context retrieved from the system database at block 501. (In some embodiments, it may be possible for a child to view a presentation more than once).

FIGS. 5A and 5B depict educational presentations that generally contain two parts: an educational display and an examination. For example, the educational display might consist of a chapter of a novel, and the examination might be a series of questions related to the reading. Some presentations might consist of only one part, i.e., only the display or only the examination. This might occur, for example, when the child reads a chapter of a novel from a book in his possession, views a live theatrical performance, or listens to a musical selection on the radio or television, and uses the system of the invention only for the examination component of the presentation. In such cases, that portion not required is omitted.

The examination component may be a traditional test, such as a collection of mathematics problems, or can be a more interactive exercise, such as a chess game or a crossword puzzle. A person skilled in the art will be able to introduce variations on the presentations described here, such as interleaving the display and examination components, or using other known variations.

At block 508, a software timer, which provides a time limit on the educational presentation, is initialized, and at block 509 the presentation itself is provided to the child. The presentation may be written material, such as a magazine article or a chapter of a textbook, or can be graphical or musical material, such as a set of paintings or musical selections along with explanatory instruction, or it can be any other content as known in the art. Optionally, a statement specifying the goals of the presentation may be provided as part of the display component or part of the examination component, depending on the application. If the display component is to be omitted, the timer can be initialized to zero; if no time limit is to be imposed on the display component, the timer can be initialized to a very large number. Control exits block 509 when the display completes or the timer expires, whichever comes first.

Thereafter, control proceeds to block 520 from where, based on whether the child has completed viewing the display or the timer has expired, a control branch is made either to block 525 or block 521. In the case that the timer expired, a message is sent to the child indicating that time is up, and the system requests feedback from the child regarding how to proceed. If the child wants to continue with the interrupted presentation, control returns to block 508 where the child can continue the presentation; otherwise the system saves the current context in the system database and control returns to block 404 of FIG. 4.

When the display component of a presentation is completed by the child, control transfers to block 525, where the child begins the examination component of the presentation, which is the portion of the presentation during which the child can earn "points." At block 525, then, the child is presented with an examination menu. Optionally, the child may select the difficulty level of the examination (more difficult levels offering potentially more points). The system receives the child's response of an examination selection at block 526, and, based on the selection, an examination of appropriate difficulty is provided to the child at block 527. As is known in the art, depending on the application, the examination at block 527 may include multiple choice or true/false questions; short, written answers; essays; mathematical or scientific problems requiring a solution; standardized tests; as well as graphical or multi-media responses. Other types of examinations as known in the art can also be included. A timer arrangement as discussed above for the display component of the presentation may also be used, as understood by persons skilled in the art, in the examination portion, so that when a response is not received from the child within a certain length of time, the system saves the child's examination context and exits. Upon the completion of the examination, then, at block 528, the examination is scored and results are reported to the child. Then, the number of points accumulated by the child is updated in the database at block 529, and control returns to block 404 of FIG. 4.

In the preferred embodiment, the central computer downloads presentation material to the user's local computer. The presentation material is then presented to the child from the child's local computer, without requiring interaction with the central system. This downloading of material takes place after the saved context has been retrieved, as indicated by 540. Since interaction with the central computer is not required, the communications link to the user's computer may be temporarily disconnected at this point. At a timeout, the user's computer transmits the presentation context to the central system computer for storage there in the system database, and the downloaded presentation material is deleted from the user's computer. To do this, the child's communication link with the central computer is re-established at this point and communication with the child proceeds from there. If no timeout occurs and, instead, the presentation completes, i.e., after the score has been established in block 528, the downloaded presentation material is deleted from the user's computer, which then re-establishes communication with the central computer and transmits the score there. Since the number of points earned during the presentation is temporarily stored in the user's local computer, this data is preferably encrypted—and decrypted at the central server—to prevent tampering by the user.

The technique described above of downloading educational material to the user's computer for local interaction is only one way of providing the child with the presentation.

Based on this disclosure, a person skilled in the art may depart from the method described above to create other embodiments in which educational presentation material is provided in yet other ways. For example, instead of downloading the presentation to the user's computer, the interaction can proceed continuously with the central system computer over the network, the user's local computer functioning merely as an intelligent terminal. Intermediate situations, i.e., where the interaction proceeds directly with the central server, but, over the course of the presentation, various pieces are downloaded and executed locally, also may be used for appropriate content. In the case that all interaction proceeds continuously with the central computer, the user's computer need not store earned points since examinations are scored centrally at the central computer. Also, as noted, content may be available at the user's computer, in which case the central computer transfers control to the local computer's software and on completion receives the earned points.

If a particular presentation is to be made by an authorized third party content provider, the sequence of steps that are carried out to provide the child with the presentation is as follows, as shown in blocks 510–513. The central system computer sends a message to the user's computer identifying the electronic address (e.g., Internet address, or URL) of the third party provider's presentation. The user's computer connects to the third party provider and participates in the educational presentation by: interacting directly with the third party; downloading software from the third party; or an intermediate situation as discussed above. On completion of the presentation, the number of earned points is transmitted from the user's computer to the central computer, or directly from the third party's computer to the central system computer, or from the third party's computer to the user's computer, which then transmits it to the central system computer. The route of transmittal depends on the chosen application. The central system computer should validate the third party's activities to ensure, for example, that the provider does not award an excessive number of points.

Figure 6:
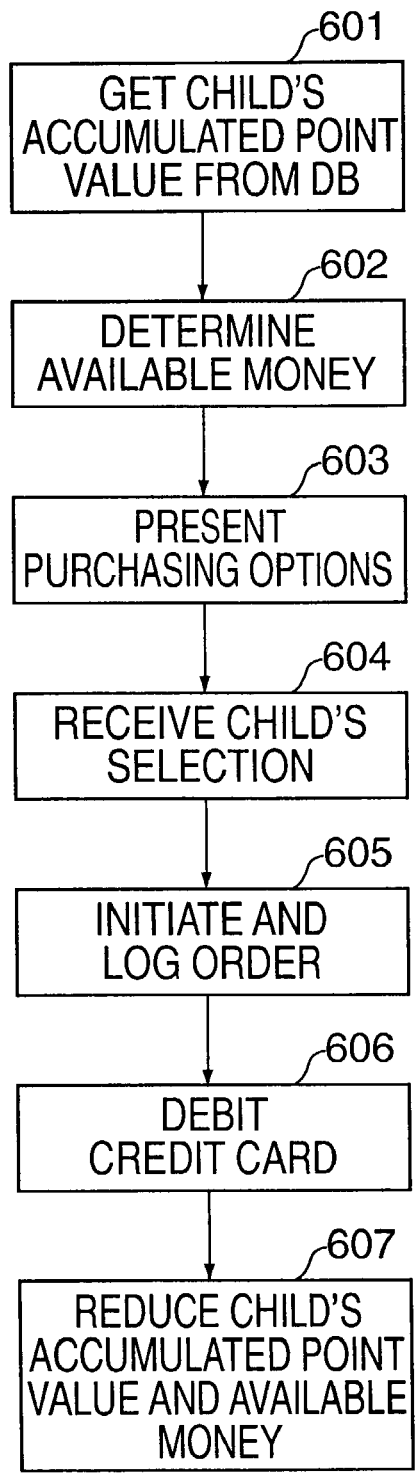
FIG. 6 illustrates the flowchart of the purchase subsystem.

FIG. 6 shows the purchase subsystem. Beginning at block 601, the system retrieves the child's accumulated point total. Control then proceeds to block 602, where the system retrieves the monetary amount available to the child at that time. For example, a parent may specify that his child may spend up to $15 each month, and if no purchases are made over a two month period, then $30 is available, but at no time is more than $30 ever to be available to the child. Control passes to block 603, where the system presents the child with a menu of purchasing choices consistent with the child's accumulated point total and available purchasing power, as determined in blocks 601 and 602. In addition, items on the menu are consistent with any specified parental preferences. For example, the parent may have indicated that toys of a violent nature are to be precluded. The purchasing choices can also be presented using an on-line virtual shopping mall, as known in the art.

At block 604, the system receives the child's selection(s), and at block 605 initiates and logs the order. Orders can be communicated to suppliers of goods and/or services by e-mail, postal mail, voice telephone, or any other means known in the art, and in the preferred embodiment must specify the item(s) that are ordered along with any required features (size, color, model number, catalog number, etc.), the child's name, and the child's address. Also, depending on the choice, coupons for store credit or entertainment events, for example, can be printed at the user's computer. In some situations, electronic goods can be downloaded to the child's computer (a computer game, for example.). At block 606, the parent's credit card account is debited by the appropriated amount, based on the selected item(s). Alternatively, the credit card may be credited regularly on a periodic basis (e.g. monthly). In this case, the purchase total would be deducted from the total accumulated monetary amount, which is stored in the system's database. Finally, at block 607 the child's accumulated point total is reduced by an amount consistent with the child's purchase, and control returns to the child dialogues high-level menu, block 401 of FIG. 4.

Figure 7:
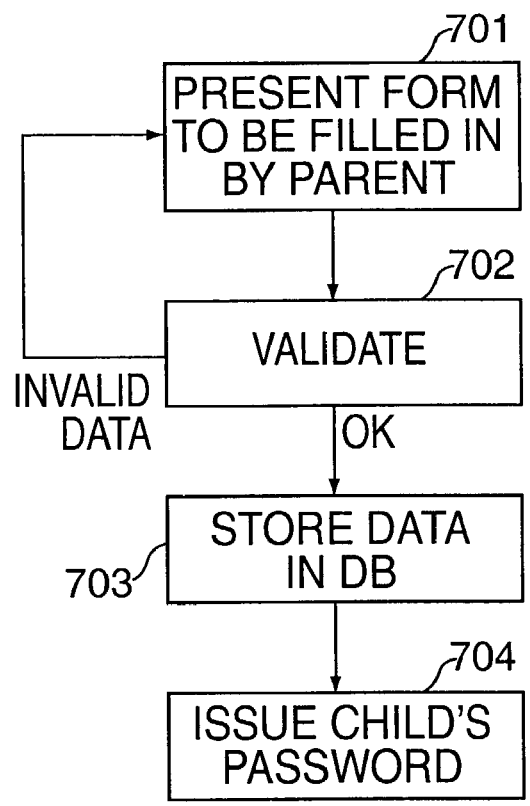
FIG. 7 illustrates the flowchart of the new child account dialogue.

FIG. 7 shows the new child account dialogue, which allows a parent to open a new account for a child. Control is passed here from block 303 of FIG. 3. Starting, then, at block 701, the system provides the parent with a screen form, requesting that the parent fill in the form and provide the system with information necessary to open a new account. The information includes, for example, the child's name, address, sex, age, and inclinations; parental preferences regarding presentations, advertising, and purchasing; and payment information, e.g., credit card number and allowable monthly spending limit. At block 702, the system validates the payment information by contacting, electronically, a credit card company or another source consistent with the form of payment and, if approved, stores the entered data in the system database at block 703. At block 704, the system issues a password for the newly created child account, which is presented to the parent. The child has the capability of changing the password subsequently.

Figure 8:
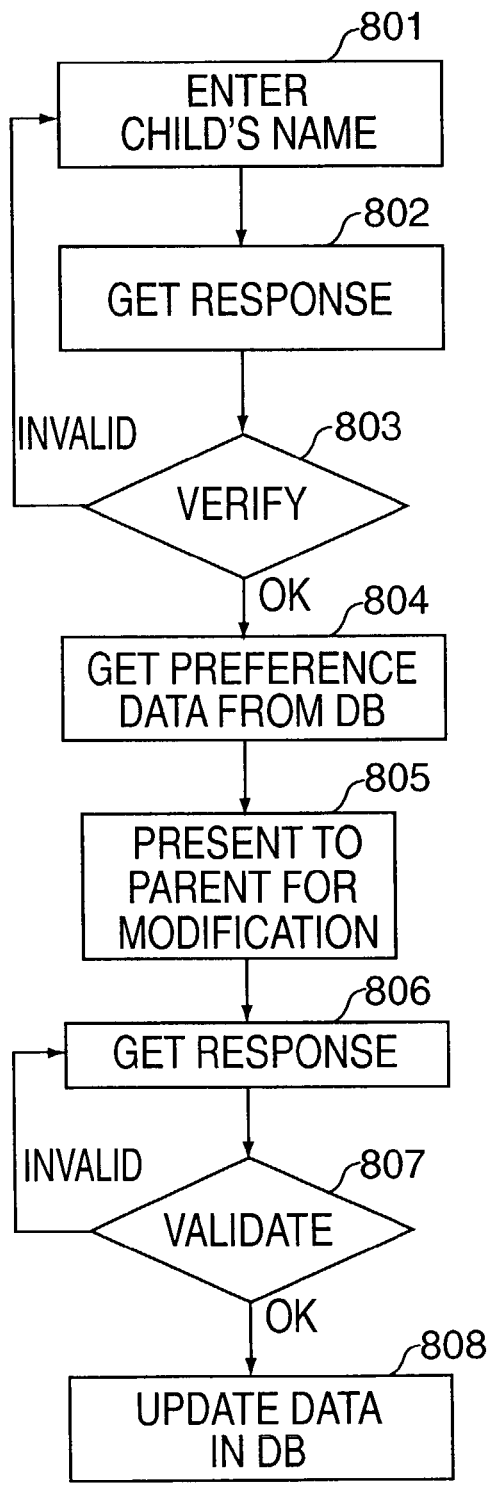
FIG. 8 illustrates the flowchart of the parental preferences dialogue.

FIG. 8 depicts the parental preferences dialogue subsystem of the preferred embodiment (see block 304). At block 801, the system of the preferred embodiment generates a prompt requesting input of a child's name, and at block 802 the system reads the entered data representing the name. Then, at block 803 a database query is made, and if the child's name is found associated with the parent, control proceeds to block 804; otherwise, an error message is displayed and control returns to block 801. Alternatively, at block 801 the system may automatically retrieve all the children names associated with the parent and present an appropriate menu selection, thereby bypassing blocks 802 and 803.

Based on the specified child's name, parental preference data for the specified child is retrieved from the database (block 101 of FIG. 1) at block 804, and appropriately displayed to the parent at block 805. As discussed previously, illustratively, the preferences include: type and level of difficulty of educational material, preferences regarding advertising, and preferences regarding goods and services that can be purchased by the child. Specific preferences depend on the specific implementation and trade-offs associated therewith. At block 806, the user interactively changes the preference data, if desired, by specifying new parameters and, if the new data is valid and consistent, at block 808 it is then stored in the system database. If the system finds an error in the entered data, the system issues an appropriate message to the parent and control returns to block 806.

Figure 9:
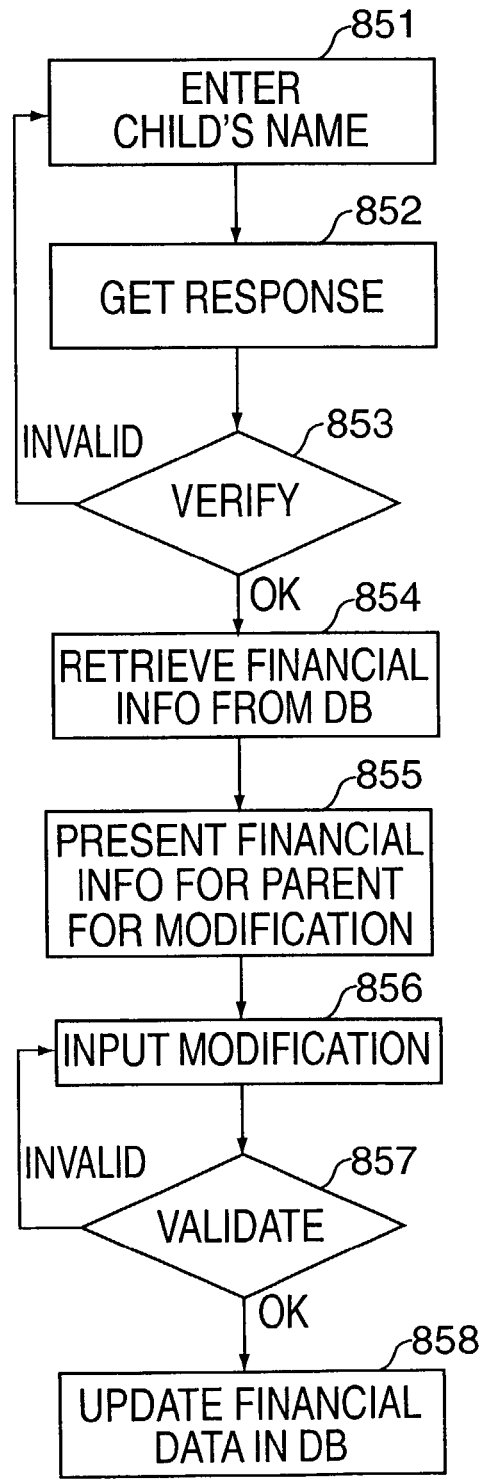
FIG. 9 illustrates the flow of modify child account dialogue.

FIG. 9 depicts the modify child's account dialogue in the system of the preferred embodiment (see block 305). At block 851, the system of the preferred embodiment generates a prompt requesting input of a child's name, and at block 852 the system inputs the entered-name. At block 853, a database query is made to validate that the child's name is indeed associated with the parent, and, if the entered name is valid, control proceeds to block 854; otherwise, an error message is displayed to the parent and control returns to block 851. Alternatively, at block 851 the system may automatically retrieve all the children's names associated with the parent and present an appropriate menu selection, thereby bypassing blocks 852 and 853. Then, at block 854 financial information is retrieved from the system database and displayed appropriately at block 855. This information includes the form of payment and the spending limit imposed on the given child. The system inputs the parent's modifications to the data at block 856, and validates them at block 857. The validation step may include contacting a financial institution, electronically or through an operator, if limits are changed significantly or if a payment mechanism has been changed, e.g., a new credit card number is entered. Optionally, validation can include fraud detection verification that tests for significant or unusually frequent fluctuations in payment limits. Once the new financial data has been validated, it is stored in the system database at 858.

Figure 10:
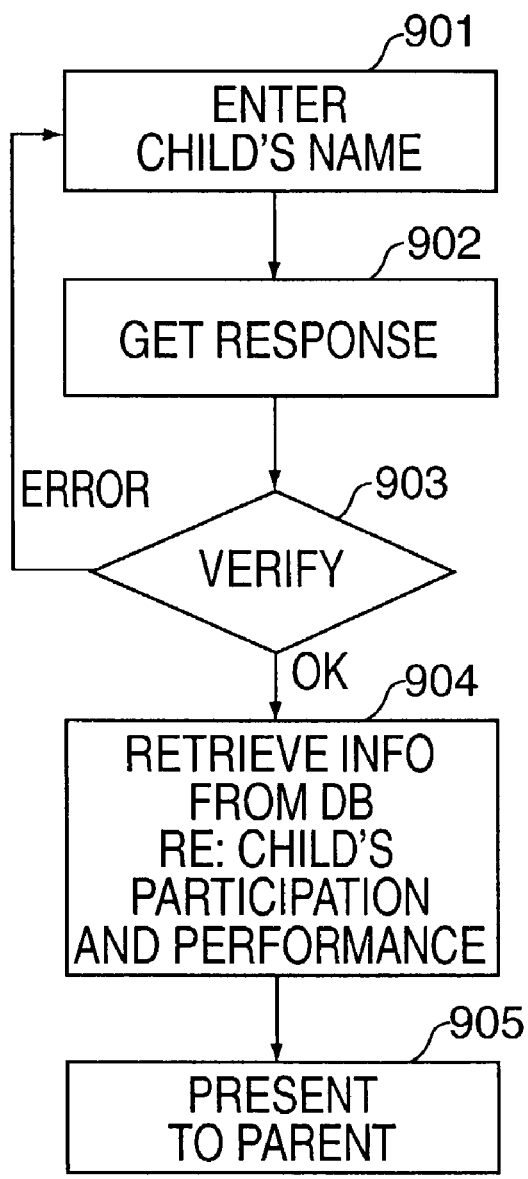
FIG. 10 illustrates the flowchart of monitoring child's progress.

FIG. 10 depicts the monitor child's performance dialogue of the preferred embodiment. At block 901, the system of the preferred embodiment generates a prompt requesting input of a child's name, and at block 902 the system inputs the name entered by the parent. Then, at block 903 the system executes a database query and, if the child's name is indeed found to be associated with the parent, control proceeds to block 904; otherwise an error message is displayed and control returns to block 901. Alternatively, at block 901 the system may automatically retrieve all the children's names associated with the parent and present an appropriate menu selection, thereby bypassing blocks 902 and 903. At block 904 the system determines and appropriately displays (block 905) to the parent information regarding his child's participation and performance, including the total number of points accumulated by the child, the child's purchase history, and the history of educational presentations participated in by the child. In the preferred embodiment, the information is stored in the system database in a separate child log table associated with each child. Each event concerning a child, e.g., participation in a particular educational presentation or a purchase, is recorded in the child's log table by the system. It is retrieved with an appropriate query expressed in a query language, such as SQL, supported by the database management system (block 102 of FIG. 1). In other embodiments, other techniques know in the art may be used; for example, a separate log file may be associated with each child, or a single log file or table recording events associated with all users of the system may be used. (Log files need not be under the control of the database management system—block 102 of FIG. 1—but instead can be managed using the file system capabilities provided by the native Operating System.)

Figure 11:
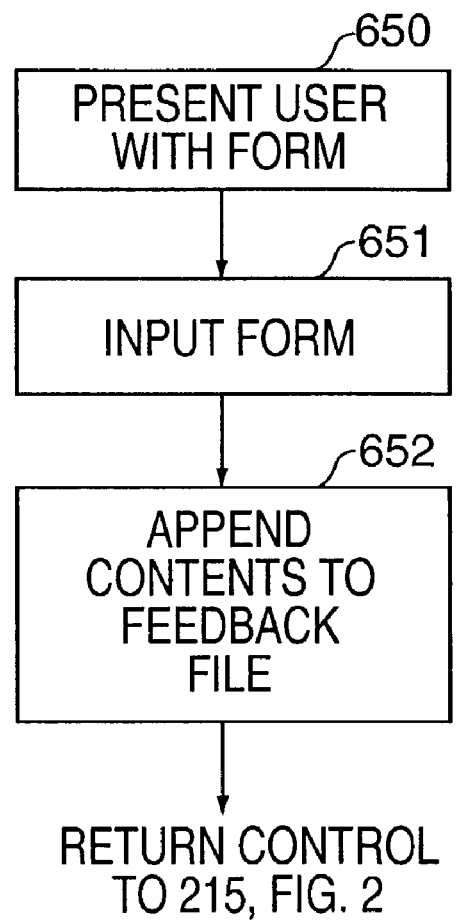
FIG. 11 illustrates the flowchart of the feedback manager.

FIG. 11 depicts the feedback manager 107, which is used by users to send suggestions, complaints, and/or comments to the system administrators and management. In the preferred embodiment, feedback messages are stored in a separate disk file. The feedback file is not controlled by the database management system (block 102 of FIG. 1) in the preferred embodiment, but in other embodiments it may indeed be. In the preferred embodiment, feedback messages are appended in a sequential fashion to the end of the feedback file as they are received from users one at a time.

At block 650 of FIG. 11, then, the user wishing to send a feedback message is given a screen form to complete. In the preferred embodiment, the form has fields for comments, suggestions, and/or complaints, in addition to other optional fields that may appear, such as the name of an educational presentation to which the comment/suggestion/complaint applies. At block 651 the completed form is input by the system, and at block 652 its contents are appended to the feedback file, as discussed above. The administrative subsystem (block 103 of FIG. 1) should include software procedures by which system administrators and managers retrieve, read, delete, and generally manage the feedback messages stored in the feedback file. Software procedures for managing a sequential file, such as the feedback file in the preferred embodiment, are known in the art. On completion, control returns to block 215 of FIG. 2.

Figure 12A:
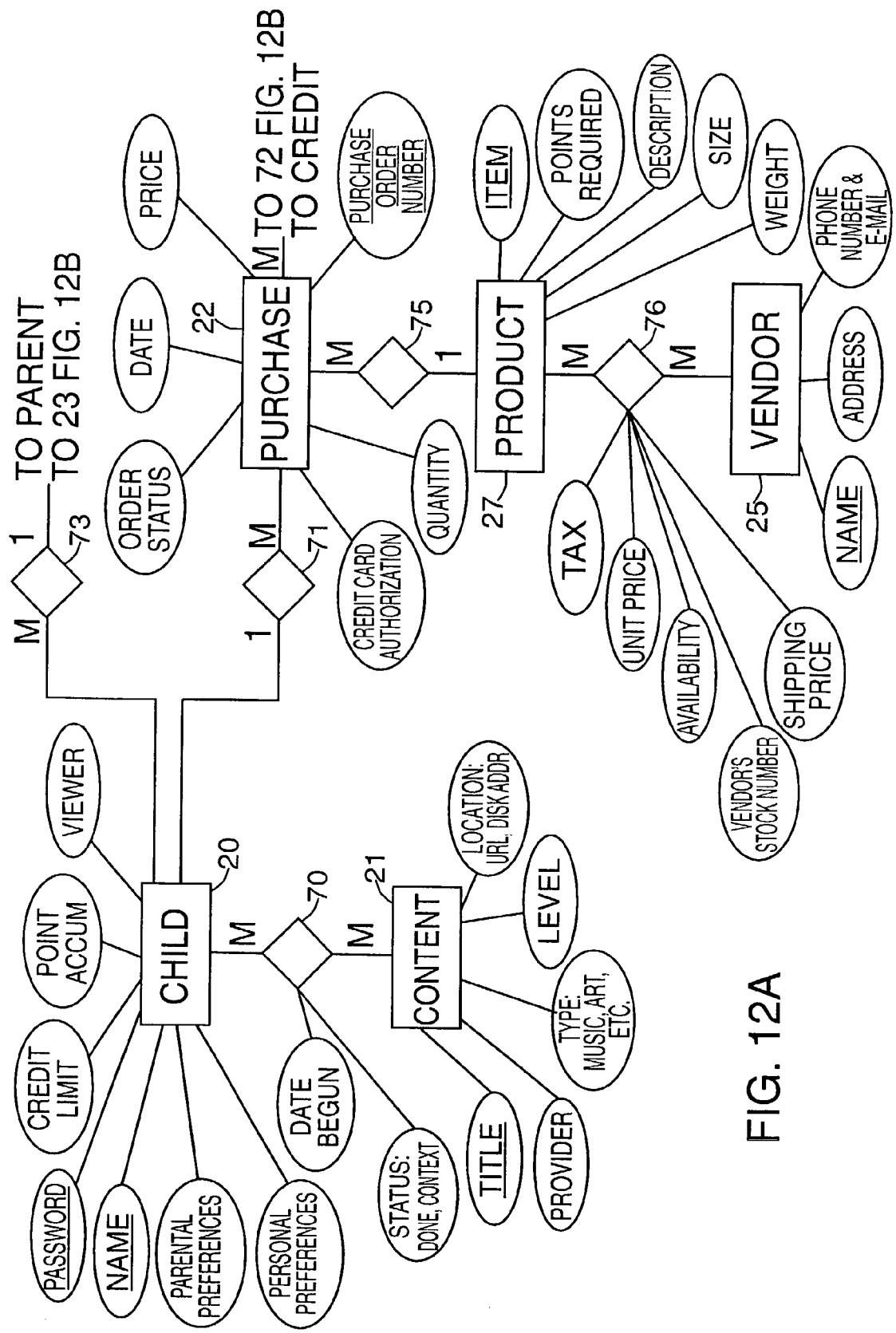
FIGS. 12A and 12B illustrates an Entity-Relationship (E-R) diagram for the system database.
Figure 12B:
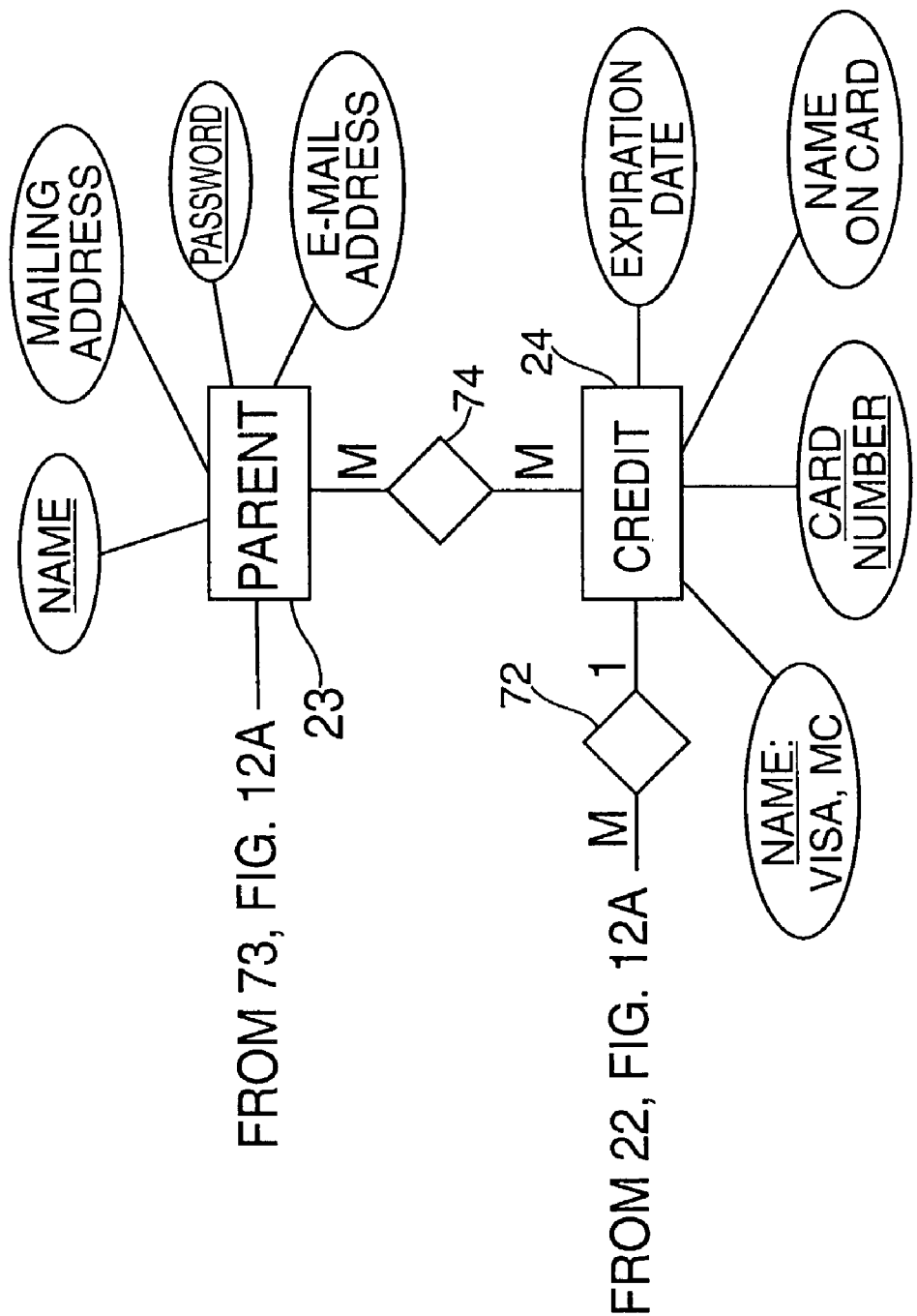

FIGS. 12A and 12B depict the organization of the system database (block 101 of FIG. 1). Other disk files, not included in the system database pictured here, are also employed in the preferred embodiment. In various embodiments of the present invention, these disk files may or may not be under the control of the database management system (block 102 of FIG. 1). In the preferred embodiment, these disk files are created, maintained, and accessed through file system capabilities provided by the native Operating System, as is known in the art, and not through the database management system. As is known in the art, using disk files for certain purposes can be more efficient than using elaborate database management system software. In the preferred embodiment, these separate disk files are used to store such things as user feedback messages, as described above in conjunction with FIG. 11, and to maintain a log of system activities to be accumulated over time for the purposes of collecting historical data. (Historical data is used by system administrators and managers to performance tune the system block 103 of FIG. 1—and for other purposes as they deem fit.) Other embodiments may choose to avoid altogether the use of disk files that are not under the auspices of the database management system. In such embodiments, such things as feedback messages and historical log files are managed by the database management system.

The system database (block 101 of FIG. 1) is modeled using an Entity-Relationship (E-R) diagram, as is commonly done in the art to describe a database. The Entity-Relationship modeling technique is described in the text by A. Silberschatz, H. Korth, and S. Sudarshan entitled *Database System Concepts*, Third Edition, McGraw-Hill Companies, Incorporated, New York, 1997, pp. 23–62, and in the text by R. Elmasri and S. Navathe entitled *Fundamentals of Database Systems*, Second Edition, Addison-Wesley Publishing Company, Menlo Park, Calif., 1994, pp. 39–68. (The cited texts are included herein by reference.) As is known, the database represents and physically stores information, which in the system of the preferred embodiment is stored physically using appropriate, e.g., magnetic, electronic, and/or optical, media. In the preferred embodiment, the database is organized as a relational database, which are generally described in the above mentioned text by Elmasri and Navathe, pp. 137–286; in other embodiments, other data organizational models, such as network or hierarchical, may be used. Network and hierarchical data models are described in the above mentioned text by Elmasri and Navathe, pp. 287–390. The items of information contained in the database and the relationships among them are depicted using conventional representation employed for databases, wherein rectangles denote entity sets, ellipses denote attributes, primary-key attributes being underlined, and diamonds denote relationship sets. As known, attributes can be associated with relationship sets as well as with entity sets, in which case they are termed "descriptive attributes." Also, as conventionally known, the indications "1" and "M" illustrate the nature of the relationship set, i.e., one-to-many, many-to-one, many-to-many, or one-to-one.

Based on the database model shown in FIGS. 12A and 12B, a person skilled in the art will be able to construct a database for a specific implementation by appropriately manipulating the informational content inherent in FIGS. 12A and 12B using known techniques, such as are described in the above mentioned text by Silberschatz, Korth, and Sudarshan. The database model depicted in FIGS. 12A and 12B include the following entity sets: child entity set 20, content entity set 21, purchase entity set 22, product entity set 27, vendor entity set 25, parent entity set 23, and credit entity set 24. The child entity set has a many-to-many relationship set 70 to the content entity set, and a one-to-many relationship set 71 to the purchase entity set. The parent has a one-to-many relationship set 73 to the child entity set, and a many-to-many relationship set 74 to the credit entity set. The credit entity set has a one-to-many relationship set 72 to the purchase entity set. The product entity set has a one-to-many relationship set 75 to the purchase entity set, and a many-to-many relationship set 76 to the vendor entity set.

In the illustrative embodiment, entity set attributes are defined to include, but are not limited to, the following, as shown in FIGS. 12A and 12B. Child entity set 20 attributes include name, password, credit limit, point accumulation, viewer, parental preferences, and personal preferences. Attributes name and password form the primary key. Content entity set 21 attributes include title, provider, type, level, and location. Attribute title forms the primary key. Purchase entity set 22 attributes include purchase order number, quantity, credit card authorization number, order status, date, and price. Attribute purchase order number forms the primary key. Product entity set 27 attributes include item, points required, description, size, and weight. Attribute item forms the primary key. Vendor entity set 25 attributes include name, address, and phone number. Attribute name forms the primary key. Parent entity set 23 attributes include name, password, mailing address, phone number, and e-mail address. Attributes name and password form the primary key. Credit entity set 24 attributes include name, card number, expiration date, and name on card. Attributes name and card number form the primary key.

In the illustrative embodiment, relationship set attributes (termed "descriptive" attributes in the art—see above mentioned text by Silberschatz, Korth, and Sudarshan, p. 28) are defined to include, but are not limited to, the following, as shown in FIGS. 12A and 12B. Relationship set 70 includes attributes status, and date begun. Relationship set 76 includes attributes vendor's stock number, availability, unit price, tax, and shipping price. In other embodiments, other relationship sets may possess descriptive attributes as well. As noted, the database of the preferred embodiment provides physical computer storage for related data.

Figure 13:
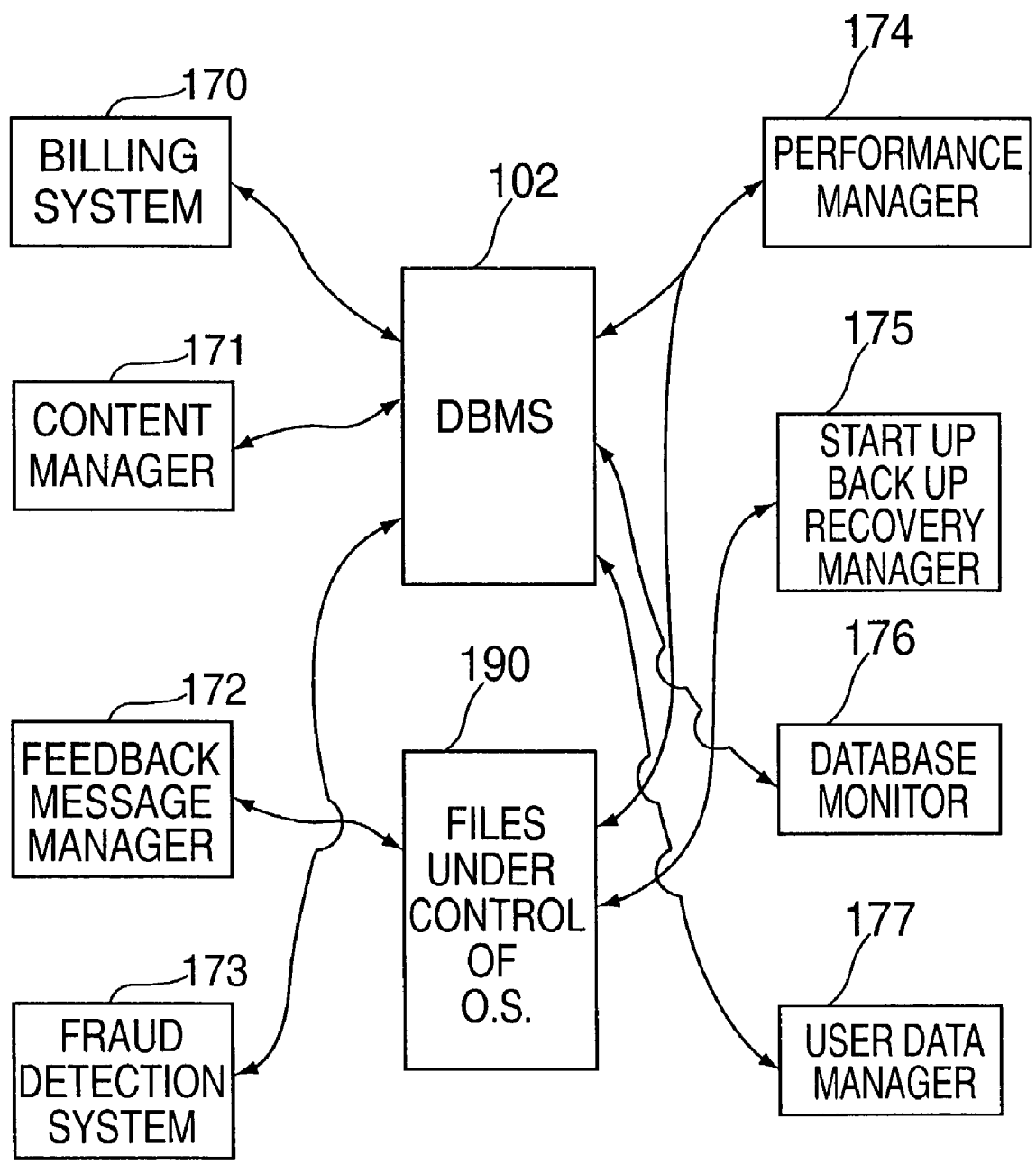
FIG. 13 illustrates the architecture and configuration of the administrative subsystem.

FIG. 13 shows the overall architecture of the administrative subsystem, which also appears as block 103 of FIG. 1. It is used by the system administrator(s) and management for monitoring performance; fraud detection; performance tuning adjustments; adding, deleting, and modifying educational and cultural material and presentations; modifying user data in the system database; billing; and system backup and recovery. As illustrated, blocks 170, 171, 173, 174, 176, and 177 shown in the figure interface and makes use of the database management system (block 102 of FIG. 1). Some, such as blocks 172, 174, and 175 in the preferred embodiment, interface and make use of general computer facilities provided by the native operating System illustrated as 190.

In the preferred embodiment, blocks 170–177 are software modules composed of software procedures and program data that perform indicated tasks.

Block 170 is the billing system, which is the software responsible for billing users and other parties for monies owed. It is composed of software components known in the art. Block 171 is the educational content manager, which is a software module responsible for inserting, modifying, and deleting content into/from the system. Block 172 is the feedback message manager, which retrieves, presents, and deletes feedback messages from the feedback file, as described above in conjunction with FIG. 11. Block 173 is the fraud detection system, which is a software module responsible for monitoring user behavior in real-time and detecting unusual system usage patterns and purchases. When it detects events that signal possible fraudulent behavior, it prints appropriate messages on an administrator's computer screen and/or disables user accounts in the system database. Block 174 is the performance manager, which supports the real-time monitoring and tuning of system resources. It provides performance statistics on computer screens manned by human administrators, and logs system behavior in appropriate log files for later recall, analysis, and study. In addition, it monitors the internal state of the system for situations that might require drastic intervention, e.g., very high CPU usage, very low free disk space, and long user response times. The performance manager provides human administrators with capabilities to tune system parameters for optimal system behavior. Block 175 is the startup, backup, and recovery manager. It is a software module responsible for starting up the system when it is down, periodically backing up the database and main memory of the computer(s), and recovering from hardware/software failures. Block 176 is a software module that provides administrators with the general capability to query, modify, and delete all information in the system database not directly connected to users and their accounts, e.g., vendor data. Block 177 is a software module that provides administrators with the specific capability of querying, modifying, and deleting information in the system database connected specifically with users and their accounts, e.g., user passwords.

Figure 14:
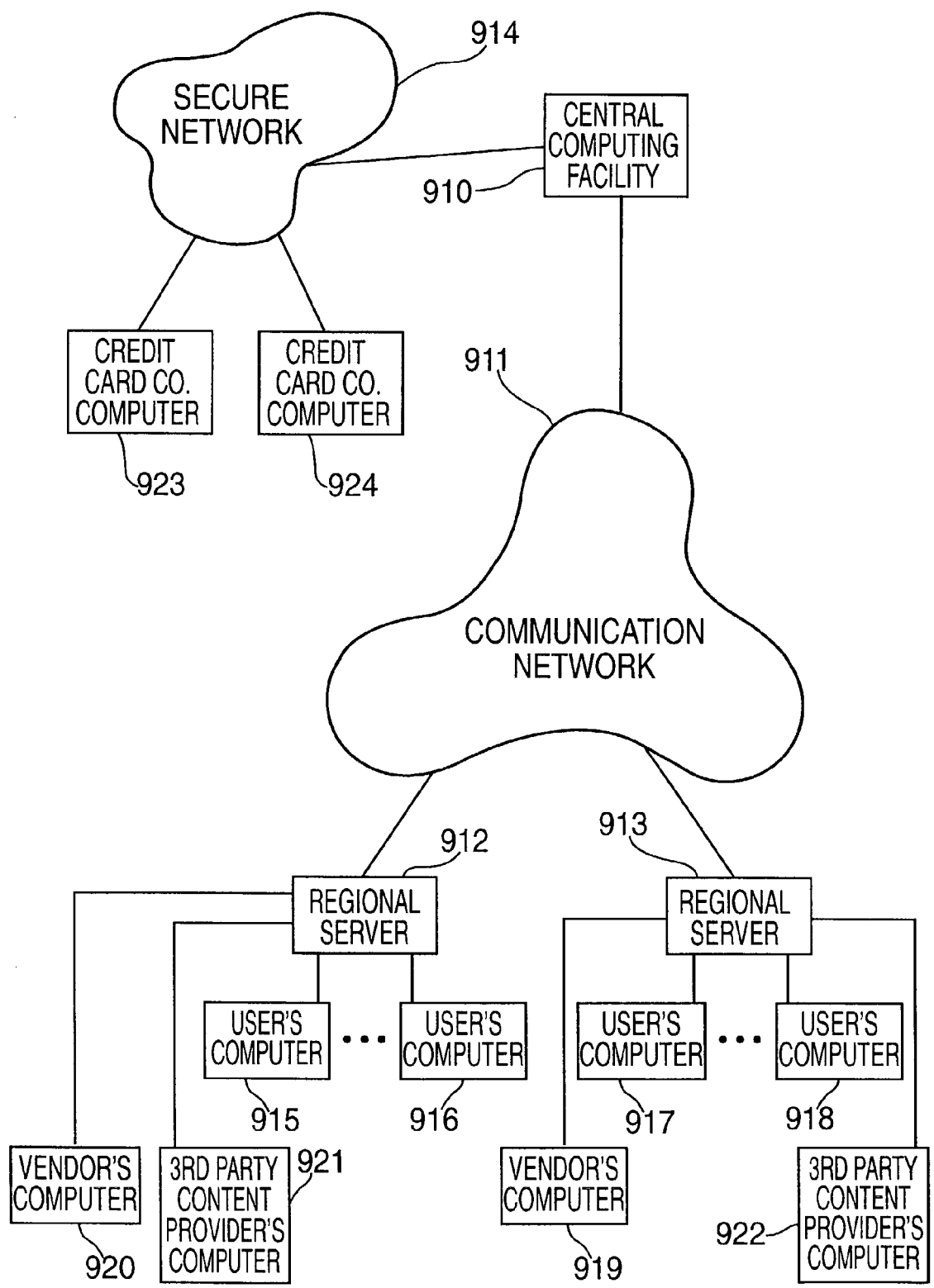
FIG. 14 illustrates the communication network configuration of the preferred embodiment of the present invention.

FIG. 14 depicts the communication network of the present invention in the preferred embodiment. Other embodiments may find it appropriate to deviate from what is shown here based on appropriate economic, marketing, technological, legal, security, reliability, and/or performance factors. Persons skilled in the art are able to take factors, such as those mentioned here, into consideration when tailoring the present invention to a particular application.

Block 910 of FIG. 14 shows the central computing facility, which also appears, but with more detail, as FIG. 1. In the preferred embodiment, it is connected to a communication network, 911, which is preferably of a telecommunications type, as known in the art. Preferably, the system of this invention takes advantage of networking capabilities provided by Internet. As known in the art, a network that is not tied to the telephone system may also be used, such as a private or semi-private wide-area network. In some applications, wireless communications means, such as satellite or radio communications, can be used. In other applications, local-area networks may also be used. Network 911 depicts the communications backbone of the present invention.

In addition to the central computing facility 910, other facilities may also be connected to the communications network 911. They include regional servers, two of which are shown as blocks 912 and 913, and also one or more secure networks for communicating with credit card companies, one of which is illustrated as 914. Such secure networks used for electronic communication with credit card companies are known in the art. Alternatively, the credit card companies, shown as 923 and 924, can be connected directly to the communications network 911 in some embodiments.

Regional servers 912 and 913 support local communication with local computers (915, 916, 917, and 918), vendors' computers (919 and 920), and/or third party content providers' computers (921 and 922). Though only two regional servers are shown for illustrative purposes, a person skilled in the art will appreciate that many such regional servers can be present in a particular application.

In the preferred embodiment, users' computers 915, 916, 917, and 918 are connected to regional servers 912 and 913 by telephone dialing through modems. Preferably, the telephone calls are local calls, or they can use available "800" number services as provided by one or more of the telephone companies. Such arrangements whereby users have a choice of making either a local call or an "800" call are known in the art. Other arrangements are also possible, such as dedicated communication lines (telephone or otherwise) between the users and regional servers 912 and 913. In some embodiments, communications services can be provided to the users by organizations other than the telephone companies, and in other embodiments wireless communications (satellite, optical, or radio, for example) can be used. Combinations of these methods can also appear, as is known in the art.

Vendors' computers 919 and 920 connect to regional servers 912 and 913, which may or may not themselves also be used to provide communications to users' computers 915, 916, 917, and 918. FIG. 14 illustratively shows servers 912 and 913 connected both to users' and vendors' computers, but that need not necessarily be the case. In some embodiments, some vendors may have their own servers. Similarly, third party content providers 921 and 922 connect to regional servers 912 and 913, or in some embodiments may have their own servers, or share servers with vendors.

As indicated above, various embodiments of the present invention can be built based on this description. For example, a simplified version of the system, in which all parents pay the same set fee, can be implemented. Another possibility is for points to be financed by advertisers, who provide advertisement displayed in conjunction with educational content. The advertiser providing advertisement with particular materials finances points when that material is used and the user is exposed to the advertisement. In yet another alternative, it is not necessary for the parent to control content. Instead, based on the difficulty level of the content, different categories of points are awarded, that is, presentations for different ages (or different types of audiences) will award different categories of points, corresponding to the age category of the content. The products available for purchase are also categorized according to different categories of points, so that older children are not able to "cheat" by completing easy, lower-level exercises and thereby gain access to products that they want without completing an appropriately difficult educational presentation. More sophisticated products can be purchased only with points in an advanced category. In another embodiment, vendors of products can give rebates, for example, to encourage purchasing of their products.

Although the preferred embodiment is directed to education and cultural enrichment, a person skilled in the art will appreciate that a variety of diverse applications may be built based on this description. For example, vendors of software products may use the system of the present invention to give potential buyers an opportunity to preview and explore their products. If, for example, the products are computer games, then in such an embodiment the content would be versions of the game available for purchase. Users would play the games for a limited amount of time and accumulate some points. These points, up to the limit established by each vendor, will then be used to provide discounts to users who decide to purchase, in this example, a game available through the purchase subsystem (block 112 of FIG. 1). Thus, users benefit by experimenting with products and, at the same time, receive discounts; vendors increase user exposure to their products. In such an application, the vendors play the role of parent and potential customers play the role of children.

Software of the preferred embodiment executes both at the central facility and at the user computer, the reason being to enhance performance given present hardware and communications constraints. In other embodiments, the system of this invention may be implemented completely at the central facility remote to the user, with the user computer running only a communication interface and Internet browser, that is, the service may be accomplished as an Internet service, where the only software executing on the user's machine is a conventional Internet browser, such as those available from Microsoft® and Netscape®. Further, the system can be implemented based on an Internet TV appliance, where the user interacts, essentially, using a remote control for selection and response.

Another alternative implementation, as understood by persons skilled in the art, is one in which most of the functions of the system of this invention are performed in the local computers. Parental preference information would be stored at the local computer as well as the accumulated number of points earned by the child. The educational materials also would be provided locally, e.g. on CD-ROMs, and the results of the interaction would be stored locally. In such an implementation, central access can be simplified and used less frequently. It might be used, for example, only to make a purchase transaction.

In a further embodiment, all central interaction may be eliminated. In such an embodiment, educational materials are provided on disks, e.g. CD-ROMS, or as content downloaded from remote sources. All interaction with the user takes place locally. The local computer scores responses and provides awards as an electronic equivalent of cash, securely stored in the local computer, and subsequently usable for Internet shopping. When all the available awards have been provided the user, the user may continue using the materials without receiving rewards, or interaction with educational materials could be disabled.

In another variation of this embodiment, instead of providing rewards as electronic cash, upon successful completion of the educational materials, a store or entertainment event certificate would be printed on the local computer's printer. A user may be provided with a choice of such rewards. For example, a menu presenting choices of different certificates consistent with the number of accumulated points is presented to the user.

Yet another form of reward that can be had by redeeming points in this embodiment is the gaining of access to computer games stored on the same medium as the educational materials themselves. That is, for different amounts of accumulated points, computer games stored on the same medium become available to a user in exchange for accu mulated points. Further, the fact that the system owes the user a particular reward can be stored on the same medium as the educational materials, e.g. on the same disk, in encrypted format. The reward would be redeemable by a user bringing the medium, e.g. disk, to a vendor, who, using decoding equipment, decodes the reward-related information, thereby enabling the user to receive his reward. In addition, the reward can be stored as money on a "smart card" or, for example, on a card provided by a transportation department authority, as a value redeemable for transportation rides. In a further stand-alone embodiment, the content can be recorded on a smart card and the rewards would be stored as money available through the use of the smart card.

Figure 15A:
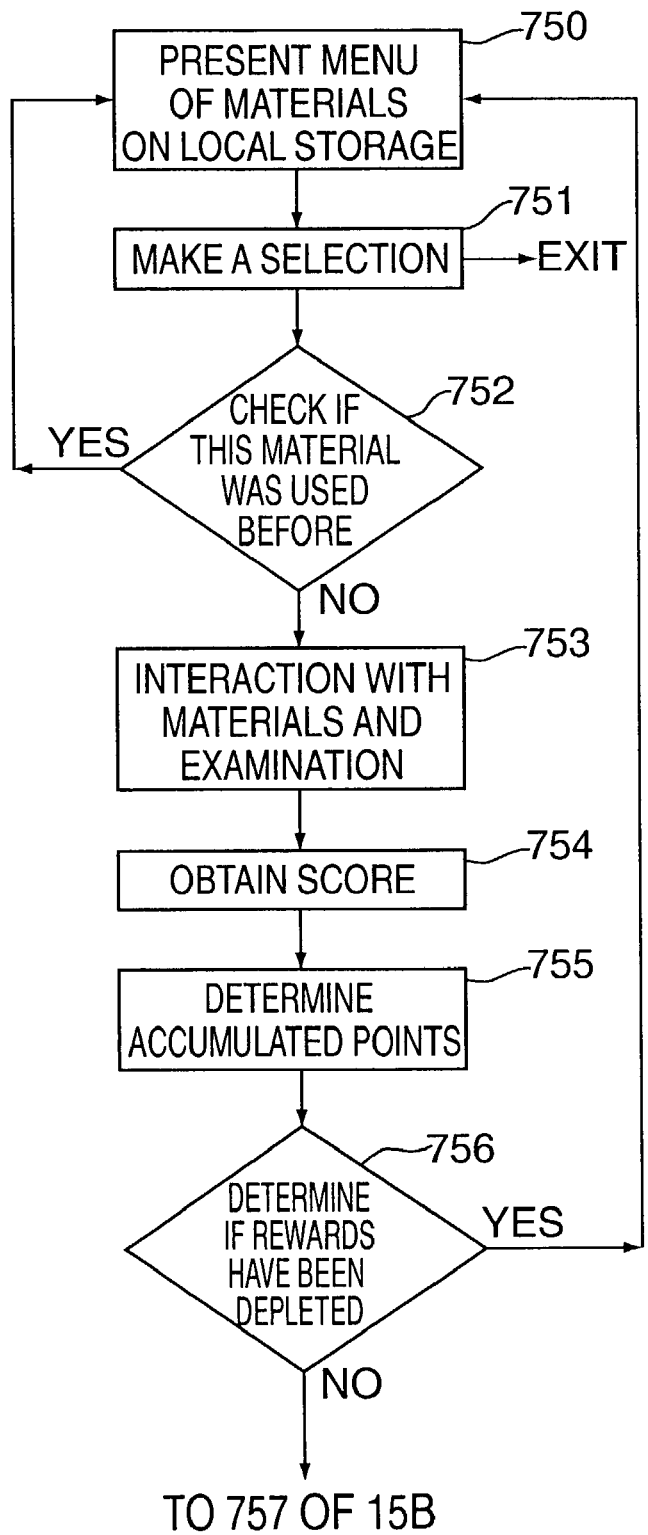
FIGS. 15A and 15B illustrate a flowchart of an alternative embodiment implemented wholly at the local computer.
Figure 15B:
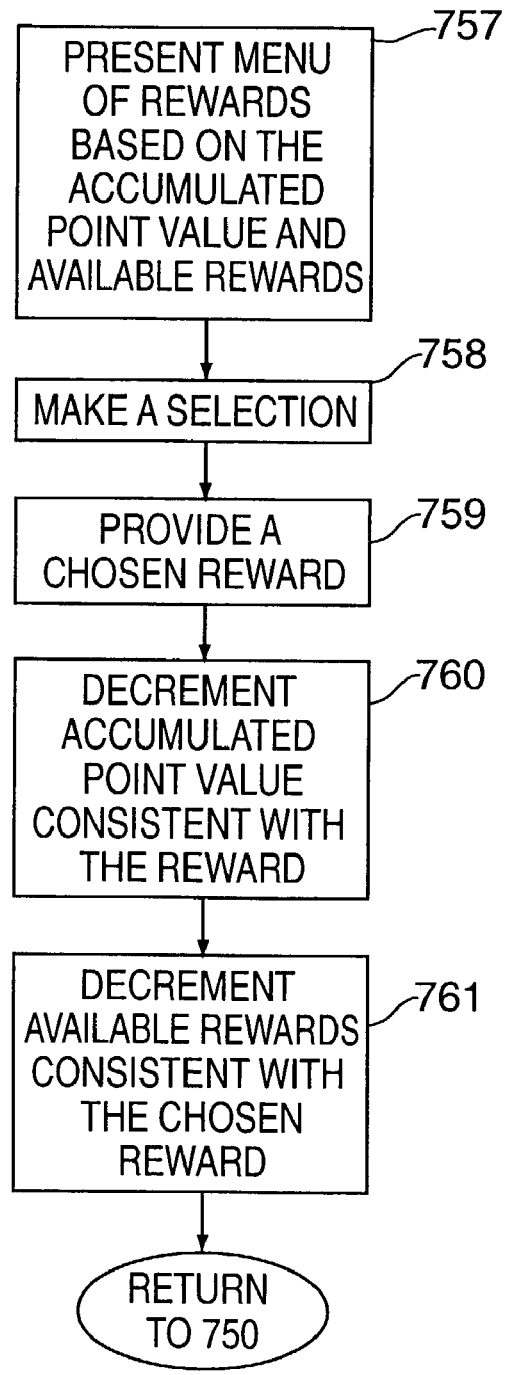

FIGS. 15A and 15B illustrate one alternative stand-alone embodiment, which is provided, for example, as a CD-ROM. A program on such a CD-ROM is executed exclusively on a user's local computer. At block 750, the menu of available materials is presented to the user. At block 751, the user makes a selection and at block 152 the system checks the hard drive of the local computer to determine whether the educational material has been already completed. If so, control returns to block 750. Otherwise, at block 753 the user is provided with the ability to interact with the educational material. (When awards are no longer available, the test at block 752 is skipped.)

At block 754, the score representing the results of the interaction is determined, and is then aggregated with the accumulated point value at block 755. At block 756, the system determines if further rewards are available, and if, all the rewards have been used, control returns to 750. In some embodiments, when all the rewards have been depleted, the program becomes disabled. If rewards are still available, at block 757 the menu of such rewards is presented. After a selection has been made at block 759, the user is provided with the chosen reward using an appropriate method as discussed above. Subsequently, at block 760 the point value and at block 761 the reward value are decreased consistent with the chosen reward. Finally, control returns to block 750, where the user is given an option to continue or to terminate the program.

It should be noted that this stand-alone embodiment is also applicable to uses outside of the field of education. For example, an interesting gift may be created through a collection of games accompanied by redeemable rewards earned as a result of playing the games. For example, a telephone company may distribute such disks as promotions, where the earned points are translated into certificates redeemable for telephone service. Also, smart-cards that combine content and monitory value related to content can be used as such gifts.

The present invention is not to be limited in scope by the specific embodiments described herein. Indeed, various modifications of the invention in addition to those described herein will become apparent to those skilled in the art from the foregoing description and accompanying figures. Such modifications are intended to fall within the scope of the appended claims. Doubtless numerous other embodiments can be conceived that would not depart from the teaching of the present invention whose scope is defined by the following claims.

We claim:

1. A computer-implemented method enabling a first user to determine the viewing preferences of a second user comprising:

providing access to electronically-stored content over the Internet via a central computer system having at least one processor and memory;

a first user specifying the viewing preferences of a second user for third party content, wherein the first user and second user are not the third party, comprising:

the first user specifying the second user's content preferences through the selection of at least one content category from a collection of content categories of desirable content to be displayed to the at least one second user;

the first user specifying the second user's advertisement preferences through the selection of at least one advertising category from a collection of advertising categories wherein the selection specifies undesirable advertisement for goods or services that should be precluded from display to the at least one second user;

the first user specifying the second user's goods or services preferences through the selection of at least one good or service from a collection of goods or services categories wherein the selection specifies undesirable goods or services that should be precluded from purchase by the at least one second user;

presenting a content selection to said second user comprising at least one instance of desirable content;

the second user selecting an instance of desirable content;

selecting at least one advertisement which is not in the category of undesirable advertisement for goods or services; and providing the selected advertisement for display to the second user in conjunction with the selected instance of the desirable content, thereby precluding display of advertisement for the undesirable categories of goods or services.

2. The method of claim 1 wherein at least some the content being stored on one or more third party computer systems, which are not part of the central computer system, and wherein the selected instance of the desirable content is provided by such third-party computer system.

3. The method of claim 1 further comprising financing second user's access to content by receiving funds for displaying advertisement to the second user.

4. The method of claim 1 further comprising enabling the second user to obtain a good or service via communication with the central computer system.

5. The method of claim 1 further comprising storing data representing a reward available to the second user as result of second user's access to the selected instance of the desirable content.

6. The method of claim 1 further comprising providing e-mail capability for certain users of the central computer system to communicate with other users.

7. A computer readable medium storing instructions, enabling a first user to determine the viewing preferences of a second user, that when executed cause a central computer to perform the steps comprising:

providing access to electronically-stored content over the Internet via the central computer system having at least one processor and memory;

a first user specifying the viewing preferences of a second user for third party content, wherein the first user and second user are not the third party, comprising:

the first user specifying the second user's content preferences through the selection of at least one content category from a collection of content categories of desirable content to be displayed to the at least one second user;

the first user specifying the second user's advertisement preferences through the selection of at least one advertising category from a collection of advertising categories wherein the selection specifies undesirable advertisement for goods or services that should be precluded from display to the at least one second user;

the first user specifying the second user's goods or services preferences through the selection of at least one good or service from a collection of goods or services categories wherein the selection specifies undesirable goods or services that should be precluded from purchase by the at least one second user;

presenting a content selection to said second user comprising at least one instance of desirable content;

the second user selecting an instance of desirable content;

selecting at least one advertisement which is not in the category of undesirable advertisement for goods or services; and providing the selected advertisement for display to the second user in conjunction with the selected instance of the desirable content, thereby precluding display of advertisement for the undesirable categories of goods or services.

8. The computer readable medium of claim 7 wherein at least some the content being stored on one or more third party computer systems, which are not part of the central computer system, and wherein the selected instance of the desirable content is provided by such third-party computer system.

9. The computer readable medium of claim 7 further enable providing e-mail capability for certain users of the central computer system to communicate with other users.

10. The computer readable medium of claim 7 further enable the first user to monitor activities of second users.

11. The computer readable medium of claim 7 wherein the undesirable advertisement comprises advertisement which is incompatible with the desirable content.

12. The computer readable medium of claim 7 wherein the undesirable goods or services comprise at least one good or service which is incompatible with the desirable content.

13. The computer readable medium of claim 7 wherein the instructions further enable the second user to obtain a good or service.

14. The computer readable medium of claim 7 wherein the first user is an individual.

15. The computer readable medium of claim 7 wherein the first user is a commercial entity.

16. A central computer system enabling a first user to determine the viewing preferences of a second user comprising:

at least one processor, memory and content;

a software module that electronically enables providing access to electronically-stored content over the Internet;

a software module that electronically enables a first user to specify the viewing preferences of a second user for third party content, wherein the first user and second user are not the third party, comprising:

a software module that electronically enables the first user to specify the second user's content preferences through the selection of at least one content category from a collection of content categories of desirable content to be displayed to the at least one second user;

a software module that electronically enables the first user to specify the second user's advertisement preferences through the selection of at least one advertising category from a collection of advertising categories wherein the selection specifies undesirable advertisement for goods or services that should be precluded from display to the at least one second user;

a software module that electronically enables the first user to specify the second user's goods or services preferences through the selection of at least one good or service from a collection of goods or services categories wherein the selection specifies undesirable goods or services that should be precluded from purchase by the at least one second user;

a software module that electronically enables presenting a content selection to such second user comprising at least one instance of desirable content;

a software module that electronically enables the second user to select an instance of desirable content;

a software module that electronically enables the selection of at least one advertisement which is not in the category of undesirable advertisement for goods or services; and a software module that electronically enables providing the selected advertisement for display to the second user in conjunction with the selected instance of the desirable content, thereby precluding display of advertisement for the undesirable categories of goods or services.

17. The system of claim 16 further comprising a software module storing account information of second users.

18. The system of claim 17 further comprising a software module enabling the second user to obtain an item of value, which may be a good or a service.

19. The system of claim 18 further comprising a software module that stores data representing a reward available to the second user as result of second user's access to the selected instance of the desirable content.

* * * * *